(12) United States Patent
Noyes

(10) Patent No.: US 9,650,251 B2
(45) Date of Patent: May 16, 2017

(54) REACTORS AND METHODS FOR PRODUCING SOLID CARBON MATERIALS

(71) Applicant: Seerstone LLC, Provo, UT (US)

(72) Inventor: Dallas B. Noyes, Provo, UT (US)

(73) Assignee: Seerstone LLC, Provo, UT (US)

( * ) Notice: Subject to any disclaimer, the term of this patent is extended or adjusted under 35 U.S.C. 154(b) by 102 days.

(21) Appl. No.: 14/648,384

(22) PCT Filed: Nov. 26, 2013

(86) PCT No.: PCT/US2013/071839
§ 371 (c)(1),
(2) Date: May 29, 2015

(87) PCT Pub. No.: WO2014/085378
PCT Pub. Date: Jun. 5, 2014

(65) Prior Publication Data
US 2015/0291424 A1    Oct. 15, 2015

Related U.S. Application Data

(60) Provisional application No. 61/731,314, filed on Nov. 29, 2012.

(51) Int. Cl.
*B01J 8/02* (2006.01)
*B01J 19/24* (2006.01)
(Continued)

(52) U.S. Cl.
CPC ............. *C01B 31/0226* (2013.01); *B01J 8/02* (2013.01); *B01J 8/025* (2013.01); *B01J 12/007* (2013.01);
(Continued)

(58) Field of Classification Search
CPC ..... B01J 8/02; B01J 19/24; B01J 19/22; B01J 2208/00893; B01J 2208/00884;
(Continued)

(56) References Cited

U.S. PATENT DOCUMENTS 1,478,730 A   12/1923   Brownlee
1,735,925 A   11/1929   Jaeger
(Continued)

FOREIGN PATENT DOCUMENTS

EP    0945402 A1   9/1999
EP    2186931 A1   5/2010
(Continued)

OTHER PUBLICATIONS

PCT International Search Report and Written Opinion for PCT/US2013/071839 dated Mar. 20, 2014.
(Continued)

*Primary Examiner* — Walter D Griffin
*Assistant Examiner* — Huy-Tram Nguyen
(74) *Attorney, Agent, or Firm* — TraskBritt, P.C.

(57) ABSTRACT

A reactor for producing a solid carbon material comprising at least one reaction chamber configured to produce a solid carbon material and water vapor through a reduction reaction between at least one carbon oxide and at least one gaseous reducing material in the presence of at least one catalyst material. Additional reactors, and related methods of producing a solid carbon material, and of forming a reactor for producing a solid carbon material are also described.

14 Claims, 24 Drawing Sheets

(51) Int. Cl.
*B01J 19/22* (2006.01)
*C01B 31/02* (2006.01)
*B01J 12/00* (2006.01)

(52) U.S. Cl.
CPC .............. *B01J 19/22* (2013.01); *B01J 19/24* (2013.01); *B01J 19/2495* (2013.01); *C01B 31/02* (2013.01); *B01J 2208/00256* (2013.01); *B01J 2208/00415* (2013.01); *B01J 2208/00433* (2013.01); *B01J 2208/00504* (2013.01); *B01J 2208/00884* (2013.01); *B01J 2208/00893* (2013.01); *B01J 2208/027* (2013.01); *B01J 2219/00038* (2013.01); *B01J 2219/00103* (2013.01); *B01J 2219/00135* (2013.01); *B01J 2219/00139* (2013.01); *B01J 2219/00157* (2013.01); *B01J 2219/24* (2013.01)

(58) Field of Classification Search
CPC ....... B01J 2208/027; B01J 2208/00256; C01B 31/0226
USPC .......................................................... 422/187
See application file for complete search history.

(56) References Cited

U.S. PATENT DOCUMENTS

| | | | |
|---|---|---|---|
| 1,746,464 | A | 2/1930 | Franz et al. |
| 1,964,744 | A | 7/1934 | Odell |
| 2,404,869 | A | 7/1946 | Sorrentino |
| 2,429,980 | A | 11/1947 | Allinson |
| 2,440,424 | A | 4/1948 | Wiegand et al. |
| 2,731,328 | A * | 1/1956 | Atkinson ................ C09C 1/487 422/156 |
| 2,745,973 | A | 5/1956 | Rappaport |
| 2,796,327 | A * | 6/1957 | Pollock ................ C01C 3/0237 423/375 |
| 2,796,331 | A | 6/1957 | Kauffman et al. |
| 2,800,616 | A | 7/1957 | Becker |
| 2,811,653 | A | 10/1957 | Moore |
| 2,819,414 | A | 1/1958 | Sherwood et al. |
| 2,837,666 | A | 6/1958 | Linder |
| 2,976,433 | A | 3/1961 | Rappaport et al. |
| 3,094,634 | A | 6/1963 | Rappaport |
| 3,172,774 | A | 3/1965 | Diefendorf |
| 3,249,830 | A | 5/1966 | Adany |
| 3,378,345 | A | 4/1968 | Bourdeau et al. |
| 3,634,999 | A | 1/1972 | Howard et al. |
| 3,714,474 | A | 1/1973 | Hoff, Jr. |
| 3,771,959 | A * | 11/1973 | Fletcher ................ B01D 53/62 128/205.28 |
| 3,846,478 | A | 11/1974 | Cummins |
| 3,905,748 | A | 9/1975 | Cairo et al. |
| 4,024,420 | A | 5/1977 | Anthony et al. |
| 4,126,000 | A | 11/1978 | Funk |
| 4,197,281 | A | 4/1980 | Muenger et al. |
| 4,200,554 | A | 4/1980 | Lauder |
| 4,602,477 | A | 7/1986 | Lucadamo |
| 4,663,230 | A | 5/1987 | Tennent |
| 4,710,483 | A | 12/1987 | Burk et al. |
| 4,725,346 | A | 2/1988 | Joshi |
| 4,727,207 | A | 2/1988 | Paparizos et al. |
| 4,746,458 | A | 5/1988 | Brotz |
| 4,900,368 | A | 2/1990 | Brotz |
| 5,021,139 | A | 6/1991 | Hartig et al. |
| 5,082,505 | A | 1/1992 | Cota et al. |
| 5,122,332 | A | 6/1992 | Russell |
| 5,133,190 | A | 7/1992 | Abdelmalek |
| 5,149,584 | A | 9/1992 | Baker et al. |
| 5,187,030 | A | 2/1993 | Firmin et al. |
| 5,260,621 | A | 11/1993 | Little et al. |
| 5,413,866 | A | 5/1995 | Baker et al. |
| 5,456,897 | A | 10/1995 | Moy et al. |
| 5,526,374 | A | 6/1996 | Uebber |
| 5,531,424 | A | 7/1996 | Whipp |
| 5,569,635 | A | 10/1996 | Moy et al. |
| 5,572,544 | A | 11/1996 | Mathur et al. |
| 5,578,543 | A | 11/1996 | Tennent et al. |
| 5,589,152 | A | 12/1996 | Tennent et al. |
| 5,624,542 | A | 4/1997 | Shen et al. |
| 5,641,466 | A | 6/1997 | Ebbesen et al. |
| 5,648,056 | A | 7/1997 | Tanaka |
| 5,650,370 | A | 7/1997 | Tennent et al. |
| 5,691,054 | A | 11/1997 | Tennent et al. |
| 5,707,916 | A | 1/1998 | Snyder et al. |
| 5,726,116 | A | 3/1998 | Moy et al. |
| 5,747,161 | A | 5/1998 | Iijima |
| 5,780,101 | A | 7/1998 | Nolan et al. |
| 5,877,110 | A | 3/1999 | Snyder et al. |
| 5,910,238 | A | 6/1999 | Cable et al. |
| 5,965,267 | A | 10/1999 | Nolan et al. |
| 5,997,832 | A | 12/1999 | Lieber et al. |
| 6,099,965 | A | 8/2000 | Tennent et al. |
| 6,159,892 | A | 12/2000 | Moy et al. |
| 6,183,714 | B1 | 2/2001 | Smalley et al. |
| 6,203,814 | B1 | 3/2001 | Fisher et al. |
| 6,221,330 | B1 | 4/2001 | Moy et al. |
| 6,232,706 | B1 | 5/2001 | Dai et al. |
| 6,239,057 | B1 | 5/2001 | Ichikawa et al. |
| 6,261,532 | B1 | 7/2001 | Ono |
| 6,262,129 | B1 | 7/2001 | Murray et al. |
| 6,294,144 | B1 | 9/2001 | Moy et al. |
| 6,333,016 | B1 | 12/2001 | Resasco et al. |
| 6,346,189 | B1 | 2/2002 | Dai et al. |
| 6,361,861 | B2 | 3/2002 | Gao et al. |
| 6,375,917 | B1 | 4/2002 | Mandeville et al. |
| 6,413,487 | B1 | 7/2002 | Resasco et al. |
| 6,423,288 | B2 | 7/2002 | Mandeville et al. |
| 6,426,442 | B1 | 7/2002 | Ichikawa et al. |
| 6,465,813 | B2 | 10/2002 | Ihm |
| 6,518,218 | B1 | 2/2003 | Sun et al. |
| 6,596,101 | B2 | 7/2003 | Weihs et al. |
| 6,645,455 | B2 | 11/2003 | Margrave et al. |
| 6,683,783 | B1 | 1/2004 | Smalley et al. |
| 6,686,311 | B2 | 2/2004 | Sun et al. |
| 6,692,717 | B1 | 2/2004 | Smalley et al. |
| 6,713,519 | B2 | 3/2004 | Wang et al. |
| 6,749,827 | B2 | 6/2004 | Smalley et al. |
| 6,761,870 | B1 | 7/2004 | Smalley et al. |
| 6,790,425 | B1 | 9/2004 | Smalley et al. |
| 6,800,369 | B2 | 10/2004 | Gimzewski et al. |
| 6,827,918 | B2 | 12/2004 | Margrave et al. |
| 6,827,919 | B1 | 12/2004 | Moy et al. |
| 6,835,330 | B2 | 12/2004 | Nishino et al. |
| 6,835,366 | B1 | 12/2004 | Margrave et al. |
| 6,841,139 | B2 | 1/2005 | Margrave et al. |
| 6,843,843 | B2 | 1/2005 | Takahashi et al. |
| 6,855,301 | B1 | 2/2005 | Rich et al. |
| 6,875,412 | B2 | 4/2005 | Margrave et al. |
| 6,890,986 | B2 | 5/2005 | Pruett |
| 6,899,945 | B2 | 5/2005 | Smalley et al. |
| 6,905,544 | B2 | 6/2005 | Setoguchi et al. |
| 6,913,740 | B2 | 7/2005 | Polverejan et al. |
| 6,913,789 | B2 | 7/2005 | Smalley et al. |
| 6,916,434 | B2 | 7/2005 | Nishino et al. |
| 6,919,064 | B2 | 7/2005 | Resasco et al. |
| 6,936,233 | B2 | 8/2005 | Smalley et al. |
| 6,949,237 | B2 | 9/2005 | Smalley et al. |
| 6,955,800 | B2 | 10/2005 | Resasco et al. |
| 6,960,389 | B2 | 11/2005 | Tennent et al. |
| 6,962,685 | B2 | 11/2005 | Sun |
| 6,979,709 | B2 | 12/2005 | Smalley et al. |
| 6,986,876 | B2 | 1/2006 | Smalley et al. |
| 6,998,358 | B2 | 2/2006 | French et al. |
| 7,011,771 | B2 | 3/2006 | Gao et al. |
| 7,041,620 | B2 | 5/2006 | Smalley et al. |
| 7,045,108 | B2 | 5/2006 | Jiang et al. |
| 7,048,999 | B2 | 5/2006 | Smalley et al. |
| 7,052,668 | B2 | 5/2006 | Smalley et al. |
| 7,067,098 | B2 | 6/2006 | Colbert et al. |
| 7,071,406 | B2 | 7/2006 | Smalley et al. |
| 7,074,379 | B2 | 7/2006 | Moy et al. |
| 7,094,385 | B2 | 8/2006 | Beguin et al. |
| 7,094,386 | B2 | 8/2006 | Resasco et al. |

(56) References Cited

U.S. PATENT DOCUMENTS

| | | |
|---|---|---|
| 7,094,679 B1 | 8/2006 | Li et al. |
| 7,097,820 B2 | 8/2006 | Colbert et al. |
| 7,105,596 B2 | 9/2006 | Smalley et al. |
| 7,125,534 B1 | 10/2006 | Smalley et al. |
| 7,132,062 B1 | 11/2006 | Howard |
| 7,135,159 B2 | 11/2006 | Shaffer et al. |
| 7,135,160 B2 | 11/2006 | Yang et al. |
| 7,138,100 B2 | 11/2006 | Smalley et al. |
| 7,150,864 B1 | 12/2006 | Smalley et al. |
| 7,157,068 B2 | 1/2007 | Li et al. |
| 7,160,532 B2 | 1/2007 | Liu et al. |
| 7,169,329 B2 | 1/2007 | Wong et al. |
| 7,201,887 B2 | 4/2007 | Smalley et al. |
| 7,204,970 B2 | 4/2007 | Smalley et al. |
| 7,205,069 B2 | 4/2007 | Smalley et al. |
| 7,212,147 B2 | 5/2007 | Messano |
| 7,214,360 B2 | 5/2007 | Chen et al. |
| 7,250,148 B2 | 7/2007 | Yang et al. |
| 7,270,795 B2 | 9/2007 | Kawakami et al. |
| 7,291,318 B2 | 11/2007 | Sakurabayashi et al. |
| 7,338,648 B2 | 3/2008 | Harutyunyan et al. |
| 7,365,289 B2 | 4/2008 | Wilkes et al. |
| 7,374,793 B2 | 5/2008 | Furukawa et al. |
| 7,390,477 B2 | 6/2008 | Smalley et al. |
| 7,396,798 B2 | 7/2008 | Ma et al. |
| 7,408,186 B2 | 8/2008 | Merkulov et al. |
| 7,410,628 B2 | 8/2008 | Bening et al. |
| 7,413,723 B2 | 8/2008 | Niu et al. |
| 7,452,828 B2 | 11/2008 | Hirakata et al. |
| 7,459,137 B2 | 12/2008 | Tour et al. |
| 7,459,138 B2 | 12/2008 | Resasco et al. |
| 7,473,873 B2 | 1/2009 | Biris et al. |
| 7,510,695 B2 | 3/2009 | Smalley et al. |
| 7,527,780 B2 | 5/2009 | Margrave et al. |
| 7,563,427 B2 | 7/2009 | Wei et al. |
| 7,563,428 B2 | 7/2009 | Resasco et al. |
| 7,569,203 B2 | 8/2009 | Fridman et al. |
| 7,572,426 B2 | 8/2009 | Strano et al. |
| 7,585,482 B2 | 9/2009 | Resasco et al. |
| 7,585,483 B2 | 9/2009 | Edwin et al. |
| 7,601,322 B2 | 10/2009 | Huang |
| 7,611,579 B2 | 11/2009 | Lashmore et al. |
| 7,615,204 B2 | 11/2009 | Ajayan et al. |
| 7,618,599 B2 | 11/2009 | Kim et al. |
| 7,622,059 B2 | 11/2009 | Bordere et al. |
| 7,632,569 B2 | 12/2009 | Smalley et al. |
| 7,645,933 B2 | 1/2010 | Narkis et al. |
| 7,655,302 B2 | 2/2010 | Smalley et al. |
| 7,670,510 B2 | 3/2010 | Wong et al. |
| 7,700,065 B2 | 4/2010 | Fujioka et al. |
| 7,704,481 B2 | 4/2010 | Higashi et al. |
| 7,718,283 B2 | 5/2010 | Raffaelle et al. |
| 7,719,265 B2 | 5/2010 | Harutyunyan et al. |
| 7,731,930 B2 | 6/2010 | Taki et al. |
| 7,736,741 B2 | 6/2010 | Maruyama et al. |
| 7,740,825 B2 | 6/2010 | Tohji et al. |
| 7,749,477 B2 | 7/2010 | Jiang et al. |
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Suekane et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,919,065 B2 | 4/2011 | Pedersen et al. |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin et al. |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan et al. |
| 8,017,282 B2 | 9/2011 | Choi et al. |
| 8,017,892 B2 | 9/2011 | Biris et al. |
| 8,038,908 B2 | 10/2011 | Hirai et al. |
| 8,114,518 B2 | 2/2012 | Hata et al. |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 2001/0009119 A1 | 7/2001 | Murray et al. |
| 2002/0054849 A1 | 5/2002 | Baker et al. |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0131910 A1* | 9/2002 | Resasco ............... B01J 8/0055 422/139 |
| 2002/0172767 A1 | 11/2002 | Grigorian et al. |
| 2003/0059364 A1 | 3/2003 | Prilutskiy |
| 2003/0147802 A1* | 8/2003 | Smalley ................ B82Y 30/00 423/447.3 |
| 2003/0194362 A1* | 10/2003 | Rogers .................... C01B 3/323 422/222 |
| 2004/0053440 A1 | 3/2004 | Lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0151654 A1 | 8/2004 | Wei et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0074392 A1 | 4/2005 | Yang et al. |
| 2005/0079118 A1 | 4/2005 | Maruyama et al. |
| 2005/0100499 A1 | 5/2005 | Oya et al. |
| 2005/0176990 A1 | 8/2005 | Coleman et al. |
| 2005/0244325 A1 | 11/2005 | Nam et al. |
| 2005/0276743 A1 | 12/2005 | Lacombe et al. |
| 2006/0013757 A1 | 1/2006 | Edwin et al. |
| 2006/0032330 A1 | 2/2006 | Sato |
| 2006/0039849 A1 | 2/2006 | Resasco et al. |
| 2006/0045837 A1 | 3/2006 | Nishimura |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0133990 A1 | 6/2006 | Hyeon et al. |
| 2006/0141346 A1 | 6/2006 | Gordon et al. |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0225534 A1 | 10/2006 | Swihart et al. |
| 2006/0228286 A1 | 10/2006 | Tada et al. |
| 2006/0239890 A1 | 10/2006 | Chang et al. |
| 2006/0239891 A1 | 10/2006 | Niu et al. |

(56) References Cited

U.S. PATENT DOCUMENTS

| | | |
|---|---|---|
| 2006/0245996 A1 | 11/2006 | Xie et al. |
| 2006/0275956 A1 | 12/2006 | Konesky |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0080605 A1 | 4/2007 | Chandrashekhar et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0183959 A1 | 8/2007 | Charlier et al. |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |
| 2008/0008644 A1 | 1/2008 | Resasco et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0160312 A1 | 7/2008 | Furukawa et al. |
| 2008/0169061 A1 | 7/2008 | Tour et al. |
| 2008/0176069 A1 | 7/2008 | Ma et al. |
| 2008/0182155 A1 | 7/2008 | Choi et al. |
| 2008/0193367 A1 | 8/2008 | Kalck et al. |
| 2008/0217588 A1 | 9/2008 | Arnold et al. |
| 2008/0226538 A1 | 9/2008 | Rumpf et al. |
| 2008/0233402 A1 | 9/2008 | Carlson et al. |
| 2008/0260618 A1 | 10/2008 | Kawabata |
| 2008/0274277 A1 | 11/2008 | Rashidi et al. |
| 2008/0279753 A1 | 11/2008 | Harutyunyan |
| 2008/0280136 A1 | 11/2008 | Zachariah et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2008/0318357 A1 | 12/2008 | Raffaelle et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0035569 A1 | 2/2009 | Gonzalez et al. |
| 2009/0056802 A1 | 3/2009 | Rabani |
| 2009/0074634 A1 | 3/2009 | Tada et al. |
| 2009/0081454 A1 | 3/2009 | Axmann et al. |
| 2009/0087371 A1 | 4/2009 | Jang et al. |
| 2009/0087622 A1 | 4/2009 | Busnaina et al. |
| 2009/0124705 A1 | 5/2009 | Meyer et al. |
| 2009/0134363 A1 | 5/2009 | Bordere et al. |
| 2009/0136413 A1 | 5/2009 | Li et al. |
| 2009/0140215 A1 | 6/2009 | Buchholz et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0004468 A1 | 1/2010 | Wong et al. |
| 2010/0009204 A1 | 1/2010 | Noguchi et al. |
| 2010/0028735 A1 | 2/2010 | Basset et al. |
| 2010/0034725 A1 | 2/2010 | Harutyunyan |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104808 A1 | 4/2010 | Fan et al. |
| 2010/0129654 A1 | 5/2010 | Jiang et al. |
| 2010/0132259 A1 | 6/2010 | Haque |
| 2010/0132883 A1 | 6/2010 | Burke et al. |
| 2010/0150810 A1 | 6/2010 | Yoshida et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0196600 A1 | 8/2010 | Shibuya et al. |
| 2010/0209696 A1 | 8/2010 | Seals et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0239489 A1 | 9/2010 | Harutyunyan et al. |
| 2010/0254860 A1 | 10/2010 | Shiraki et al. |
| 2010/0254886 A1 | 10/2010 | McElrath et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0301278 A1 | 12/2010 | Hirai et al. |
| 2010/0303675 A1 | 12/2010 | Suekane et al. |
| 2010/0316556 A1 | 12/2010 | Wei et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0053020 A1 | 3/2011 | Norton et al. |
| 2011/0053050 A1 | 3/2011 | Lim et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0117365 A1 | 5/2011 | Hata et al. |
| 2011/0120138 A1 | 5/2011 | Gaiffi et al. |
| 2011/0150746 A1 | 6/2011 | Khodadadi et al. |
| 2011/0155964 A1 | 6/2011 | Arnold et al. |
| 2011/0158892 A1 | 6/2011 | Yamaki |
| 2011/0171109 A1 | 7/2011 | Petrik |
| 2011/0174145 A1 | 7/2011 | Ogrin et al. |
| 2011/0206469 A1 | 8/2011 | Furuyama et al. |
| 2011/0298071 A9 | 12/2011 | Spencer et al. |
| 2012/0034150 A1 | 2/2012 | Noyes |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2014/0021827 A1 | 1/2014 | Noyes |
| 2014/0141248 A1 | 5/2014 | Noyes |
| 2014/0348739 A1 | 11/2014 | Denton et al. |
| 2015/0059527 A1 | 3/2015 | Noyes |
| 2015/0059571 A1 | 3/2015 | Denton et al. |
| 2015/0064092 A1 | 3/2015 | Noyes |
| 2015/0064096 A1 | 3/2015 | Noyes |
| 2015/0064097 A1 | 3/2015 | Noyes |
| 2015/0071846 A1 | 3/2015 | Noyes |
| 2015/0071848 A1 | 3/2015 | Denton et al. |
| 2015/0078982 A1 | 3/2015 | Noyes |

FOREIGN PATENT DOCUMENTS

| | | |
|---|---|---|
| EP | 2404869 A1 | 1/2012 |
| JP | 3339339 B2 | 10/2002 |
| JP | 2004517789 A | 6/2004 |
| JP | 2004360099 A | 12/2004 |
| JP | 2005075725 A | 3/2005 |

(56) References Cited

FOREIGN PATENT DOCUMENTS

| | | |
|---|---|---|
| JP | 2005532976 A | 11/2005 |
| JP | 2007191840 A | 8/2007 |
| KR | 1020050072056 A | 7/2005 |
| WO | 0230816 A1 | 4/2002 |
| WO | 03018474 A1 | 3/2003 |
| WO | 2004096704 A3 | 11/2005 |
| WO | 2005103348 A1 | 11/2005 |
| WO | 2006003482 A3 | 8/2006 |
| WO | 2007086909 A3 | 11/2007 |
| WO | 2007139097 A1 | 12/2007 |
| WO | 2007126412 A1 | 6/2008 |
| WO | 2009011984 A1 | 1/2009 |
| WO | 2006130150 A1 | 4/2009 |
| WO | 2009122139 A1 | 10/2009 |
| WO | 2009145959 A1 | 12/2009 |
| WO | 2010047439 A1 | 4/2010 |
| WO | 2010087903 A1 | 8/2010 |
| WO | 2010120581 A1 | 10/2010 |
| WO | 2011009071 A1 | 1/2011 |
| WO | 2011020568 A1 | 2/2011 |
| WO | 2011029144 A1 | 3/2011 |
| WO | 2010146169 A1 | 4/2011 |
| WO | 2010124258 A1 | 5/2011 |
| WO | 2011053192 A1 | 5/2011 |
| WO | 2013090274 A1 | 6/2013 |
| WO | 2013158155 A1 | 10/2013 |
| WO | 2013158155 al | 10/2013 |
| WO | 2013158156 | 10/2013 |
| WO | 2013158156 A1 | 10/2013 |
| WO | 2013158157 A1 | 10/2013 |
| WO | 2013158158 A1 | 10/2013 |
| WO | 2013158159 A1 | 10/2013 |
| WO | 2013158160 A1 | 10/2013 |
| WO | 2013158161 A1 | 10/2013 |
| WO | 2013158438 | 10/2013 |
| WO | 2013158439 | 10/2013 |
| WO | 2013158441 | 10/2013 |
| WO | 2013162650 A1 | 10/2013 |
| WO | 2014011206 | 10/2013 |
| WO | 2014011206 A1 | 1/2014 |
| WO | 2014011631 | 1/2014 |
| WO | 2014011631 A1 | 1/2014 |
| WO | 2014085378 A1 | 6/2014 |

OTHER PUBLICATIONS

Abatzoglou, Nicolas et al., "The use of catalytic reforming reactions for C02 sequestration as carbon nanotubes," Proceedings of the 2006 IASME/WSEAS International Conference on Energy & Environmental Systems, Chalkida, Greece, May 8-10, 2006 (pp. 21-26) (available at: http://www.wseas.us/e-library/conferences/2006evia/papers/516-193.pdf).

Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.

Baker, B. A. and G. D. Smith, "Alloy Solutions to Metal Dusting Problems in the PetroChemical Industry," Special Metals Corporation, undated.

Baker, B. A. and G. D. Smith "Metal Dusting in a Laboratory Environment-Alloying Addition Effects," Special Metals Corporation, undated.

Cha, S. 1., et al., "Mechanical and electrical properties of croslinked carbon nanotubes," Carbon 46 (2008) 482-488, Elsevier, Ltd.

Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn/file/journal/1998/98__APL__72__3282-ChengHM.pdf).

Chun, Changmin, and Ramanarayanan, Trikur A., "Metal Dusting Corrosion of Metals and Alloys," 2007.

Chung, U.C., and W.S. Chung, "Mechanism on Growth of Carbon Nanotubes Using CO-H2 Gas Mixture," Materials Science Forum vols. 475-479 (2005) pp. 3551-3554.

Dai, et al., "Single-wall nanotubes produced by metal-catalyzed disproportionation of carbon monoxide," Chemical Physics Letters 260 (1996) 471-475, Elsevier.

Dresselhaus et al.. Carbon Nanolubes Synthesis. Structure, Properties, and Applications. 2001, pp. 1-9, Springer.

Garmirian, James Edwin, "Carbon Deposition in a Bosch Process Using a Cobalt and Nickel Catalyst," PhD Dissertation, Massachusetts Institute of Technology, Mar. 1980, pp. 14-185.

Grobert, Nicole, "Carbon nanolubes—becoming clean," Materials Today, vol. 10, No. 1-2, Jan.-Feb. 2007, Elsevier, pp. 28-35.

Hata, Kenji, "From Highly Efficient Impurity-Free CNT Synthesis to DWNT forests, CNTsolids and Super-Capacitors," unknown dale, unknown publisher, Research Center for Advanced Carbon Materials, National Institute of Advanced Industrial Science and Technology (AIST), Tsukuba, 305-8565, Japan.

Hiraoka, Tatsuki, et al., "Synthesis of Single- and Double-Walled Carbon Nanolube Forests on Conducting Metal Foils," 9 J. Am. Chem. Soc. 2006, 128, 13338-13339.

Holmes, et al.; A Carbon Dioxide Reduction Unit Using Bosch Reaction and Expendable Catalyst Cartridges; NASA; 1970; available at hllps:l/archive.org/delails/nasa_techdoc__1971 0002858.

Huang, Z.P., et al., "Growth of highly oriented carbon nanolubes by plasma-enhanced hot filament chemical vapor deposition," Applied Physics Letters 73:3845-3847, Dec. 28, 1998.

"INCONEL® alloy 693—Excellent Resistance to Metal Dusting and High Temperature Corrosion" Special Metals Product Sheet, 2005.

Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.

Lal, Arch It, "Effect of Gas Composition and Carbon Activity on the Growth of Carbon Nanolubes," Masters Thesis, University of Florida, 2003.

Manning, Michael Patrick, "An Investigation of the Bosch Process," PhD Dissertation, Massachusetts Institute of Technology, Jan. 1976.

Unknown author, "Metal Dusting," unknown publisher, undated.

Unknown author, "Metal Dusting of reducing gas furnace HK40 tube," unknown publisher, undated.

Muller-Lorenz and Grabke, Coking by metal dusting of steels, 1999, Materials and Corrosion 50,614-621 (1999).

Nasibulin, Albert G., et al., "Correlation between catalyst particle and single-walled carbon nanotube diameters," Carbon 43 (2005) 2251-2257.

Nasibulin, Albert G., et al., "An essential role of C02 and H20 during single-walled CNT synthesis from carbon monoxide," Chemical Physics Letters 417 (2005) 179-184.

Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofibers/synthesis-of-alumin¤nanofibers-and-composites).

Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.

Ruckenstein, E. and H.Y. Wang, "Carbon Deposition and Catalytic Deactivation during C02 Reforming of CH4 over Co/?-Al203 Catalysts," Journal of Catalysis, vol. 205, Issue 2, Jan. 25, 2002, pp. 289-293.

Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.

SAE 820875 Utilization of Ruthenium and Ruthenium-Iron Alloys as Bosch Process Catalysts. Jul. 19-21, 1982.

SAE 911451 Optimization of Bosch Reaction, Jul. 15-18, 1991.

Skulason, Egill, Metallic and Semiconducting Properties of Carbon Nanolubes, Modern Physics, Nov. 2005, slide presentation, 21

(56) References Cited

OTHER PUBLICATIONS slides, available at https:1/notendur.hi.is/egillsklstuff/annad/Egiii. Siides2.pdf, last visited Apr. 28, 2014.

Songsasen, Apisit and Paranchai Pairgreethaves, "Preparation of Carbon Nanolubes by Nickel Catalyzed Decomposition of Liquefied Petroleum Gas (LPG)," Kasetsart J. (Nat. Sci.) 35: 354-359 (2001) (available at: http:1/kasetsartjournal. ku .a c. lh/kuj_files/ 2008/A0804251 023348734. pdf). •.

Szakalos, P., "Mechanisms and driving forces of metal dusting," Materials and Corrosion, 2003, 54, No. 10, pp. 752-762.

Tsai, Heng-Yi, et al., "A feasibility study of preparing carbon nanolubes by using a metal dusting process," Diamond & Related Materials 18 (2009) 324-327, Elsevier.

Wei, et al. "The mass production of carbon nanolubes using a nano-agglomerate fluidized bed reactor: A multiscale space-lime analysis," Powder Technology 183 (2008) 10-20, Elsevier.

Wilson, Richard B., "Fundamental Investigation of the Bosch Reaction," PhD Dissertation, Massachusetts Institute of Technology, Jul. 1977, pp. 12,23, 37, 43, 44, 62, 70, 80, 83-88, 98.

XP-002719593 Thomson abstract, 1989.

Zeng, Z., and Natesan, K., Relationship between the Growth of Carbon Nanofilaments and Metal Dusting Corrosion, 2005, Chem. Mater. 2005, 17, 3794-3801.

\* cited by examiner

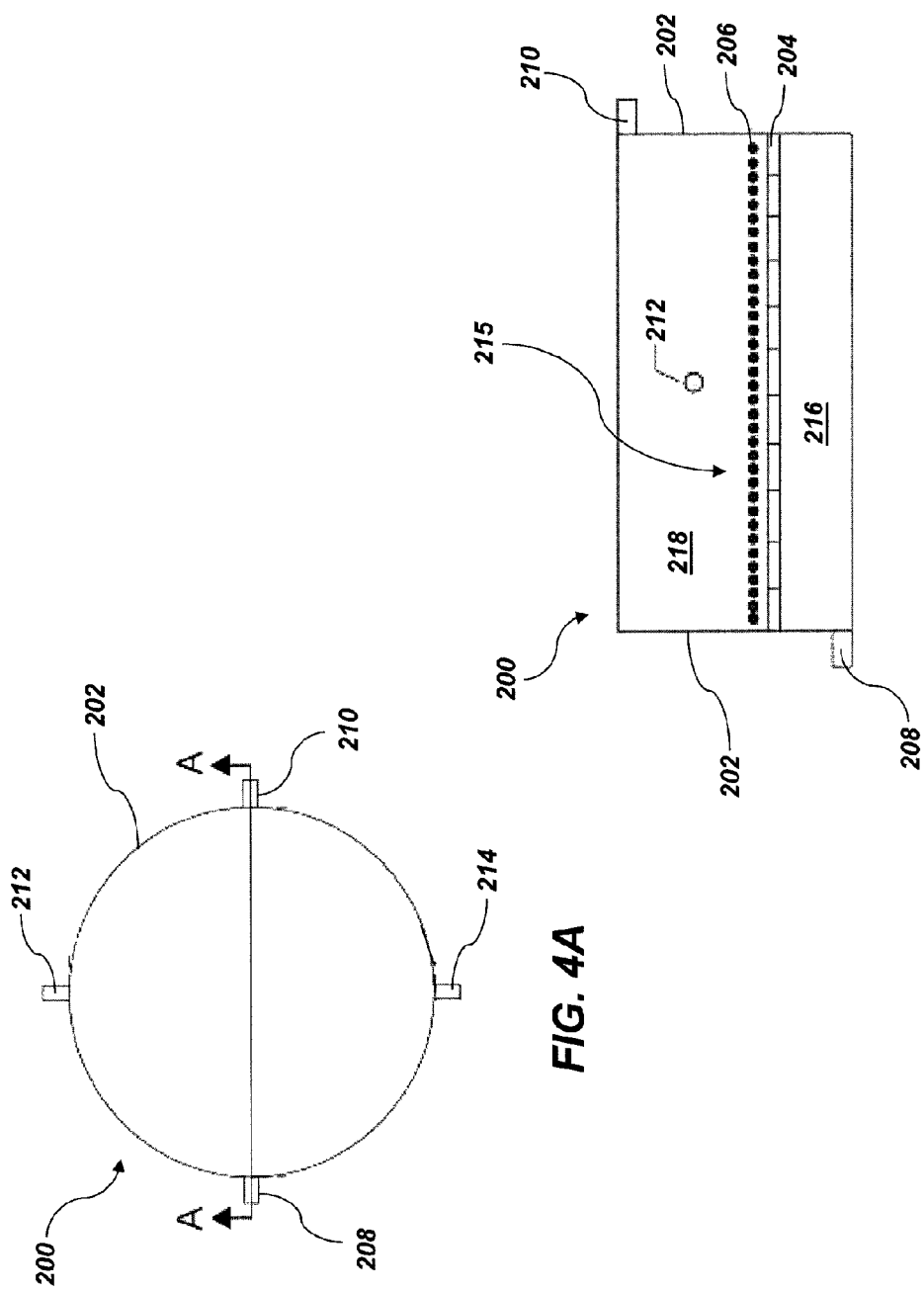

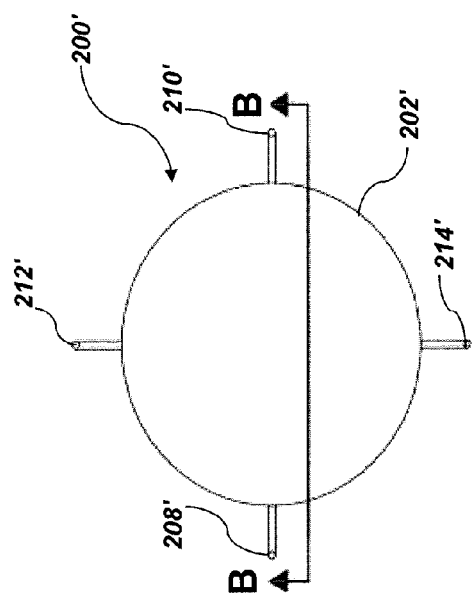
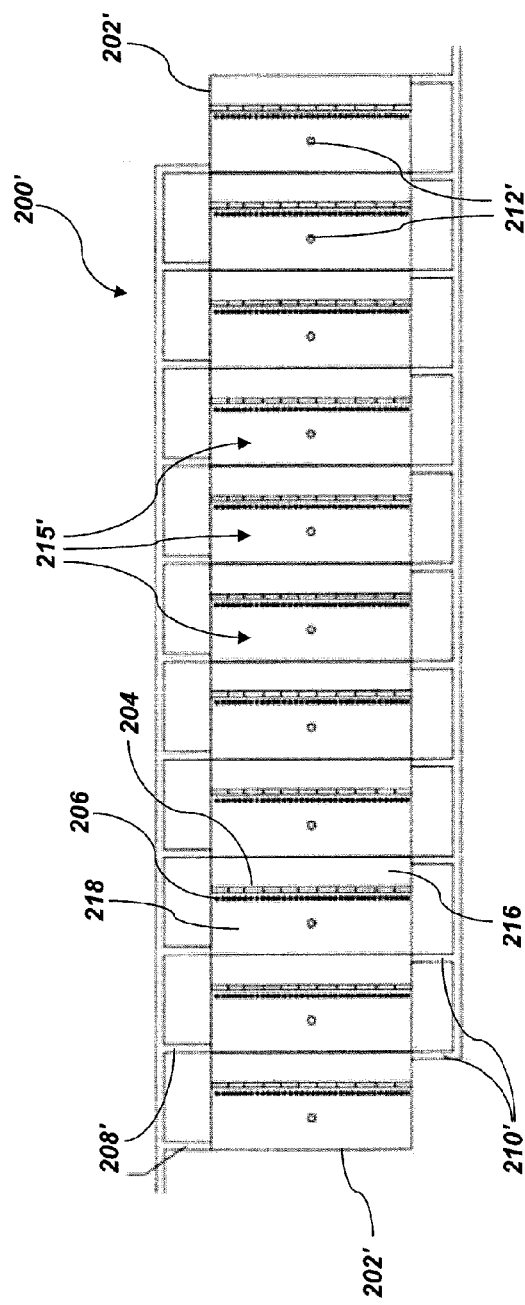
FIG. 5A
FIG. 5B

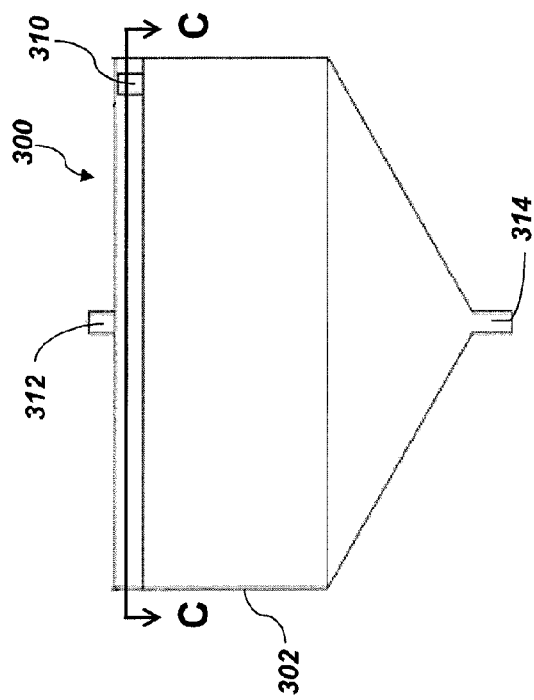
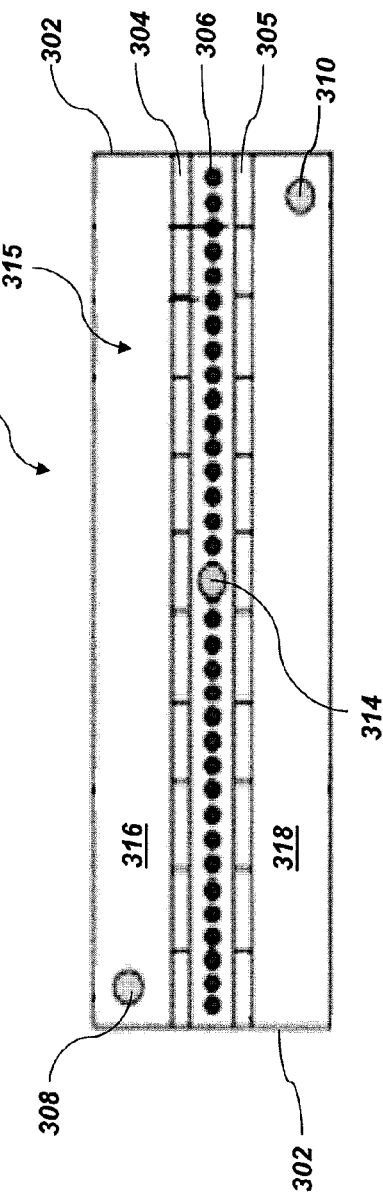
FIG. 6A
FIG. 6B

REACTORS AND METHODS FOR PRODUCING SOLID CARBON MATERIALS

PRIORITY CLAIM

This application claims the benefit of the filing date of U.S. Provisional Patent Application Ser. No. 61/731,314, filed Nov. 29, 2012, for "REACTORS FOR PRODUCING SOLID CARBON MATERIALS, AND RELATED METHODS," the contents of which are hereby incorporated herein by this reference.

TECHNICAL FIELD

Embodiments of this disclosure relate generally to reactors for producing solid carbon materials, and to related methods. More specifically, embodiments of this disclosure relate to reactors and methods for producing solid carbon materials by way of carbon oxide catalytic conversion.

BACKGROUND

This application builds upon the disclosure of U.S. patent application Ser. No. 13/263,311, filed on Oct. 6, 2011, now U.S. Pat. No. 8,679,444, issued Mar. 25, 2014, which is a national phase entry of International Application Number PCT/US2010/029934, filed Apr. 5, 2010, and published in English as International Publication Number WO 2010/120581, which itself claims the benefit under 35 U.S.C. §119(e) to U.S. Provisional Patent Application Ser. No. 61/170,199, filed Apr. 17, 2009, the disclosures of each of which are incorporated herein by reference.

Solid carbon has numerous commercial applications. These applications include longstanding uses such as uses of carbon black and carbon fibers as a filler material in tires, inks, etc., many uses for various forms of graphite (such as the use of pyrolytic graphite as heat shields) and innovative and emerging applications for buckminsterfullerene, carbon nanotubes and nanodiamonds. Conventional methods for the manufacture of various forms of solid carbon typically involve the pyrolysis of hydrocarbons in the presence of a suitable catalyst. The use of hydrocarbons as the carbon source is due to historically abundant availability and low cost of hydrocarbons. The use of carbon oxides as the carbon source in the production of solid carbon has largely been unexploited.

Carbon oxides, particularly carbon dioxide, are abundant gases that may be extracted from point source emissions such as the exhaust gases of hydrocarbon combustion or from some process off gases. Carbon dioxide may also be extracted from the air. Because point source emissions have much higher concentrations of carbon dioxide than air, they are often economical sources from which to harvest the carbon dioxide. However, the immediate availability of air may provide cost offsets by eliminating transportation costs through local manufacturing of the solid carbon products from carbon dioxide in air.

Carbon dioxide is increasingly available and inexpensive as a byproduct of power generation and chemical processes where an object may be to reduce or eliminate the emission of carbon dioxide into the atmosphere by capture and subsequent sequestration of the carbon dioxide (e.g., by injection into a geological formation). For example, the capture and sequestration of carbon dioxide is the basis for some "green" coal-fired power stations. In current practice, capture and sequestration of the carbon dioxide entails significant cost.

There are a limited number of ways that carbon, oxygen, and hydrogen can react to form solid carbon products and water. There is a spectrum of reactions involving these three elements wherein various equilibria have been identified that yield various allotropes and morphologies of solid carbon and mixtures thereof. Hydrocarbon pyrolysis involves equilibria between hydrogen and carbon that favors solid carbon production, typically with little or no oxygen present. The Boudouard reaction, also called the "carbon monoxide disproportionation reaction," is the range of equilibria between carbon and oxygen that favors solid carbon production, typically with little or no hydrogen present. The Bosch reaction is within a region of equilibria where all of carbon, oxygen, and hydrogen are present under reaction conditions that also favor solid carbon production.

The relationship between the hydrocarbon pyrolysis, Boudouard, and Bosch reactions may be understood in terms of a C—H—O equilibrium diagram, as shown in FIG. 35. The C—H—O equilibrium diagram of FIG. 35 shows various known routes to solid carbon, including carbon nanotubes ("CNTs"). The hydrocarbon pyrolysis reactions are on the equilibrium line that connects $H_2$ and C (i.e., the left edge of the triangle). The names on this line are of a few of the researchers who have published results validating CNT formation at various points on this line. The Boudouard, or carbon monoxide disproportionation reactions, are on the equilibrium line that connects $O_2$ and C (i.e., the right edge of the triangle). The equilibrium lines for various temperatures that traverse the diagram show the approximate regions in which solid carbon will form. For each temperature, solid carbon may form in the regions above the associated equilibrium line, but will not generally form in the regions below the equilibrium line.

CNTs and other forms of nanocarbons are valuable because of their unique material properties, including strength, current-carrying capacity, and thermal and electrical conductivity. Current bulk use of CNTs includes use as an additive to resins in the manufacture of composites. Research and development on the applications of CNTs is very active with a wide variety of applications in use or under consideration. One obstacle to widespread use of CNTs has been the cost of manufacture. Thus, it would be desirable to provide reactors and methods that may be used to produce solid carbon materials, such as CNTs, in a more efficient manner.

DISCLOSURE

Embodiments described herein include various types and structures of reactor apparatuses (hereinafter "reactors," or "reactor") for producing solid carbon materials, and related methods of producing solid carbon materials. For example, in accordance with one embodiment, a reactor for producing a solid carbon material comprises at least one reaction chamber configured to produce a solid carbon material and water vapor through a reduction reaction between at least one carbon oxide and at least one gaseous reducing material in the presence of at least one catalyst material.

In additional embodiments, a reactor for producing a solid carbon material comprises at least one reaction chamber configured to produce a solid carbon material and water vapor through a reduction reaction between at least one carbon oxide and at least one gaseous reducing material in the presence of at least one catalyst material, and at least one cooling chamber operatively associated with the at least one reaction chamber and configured to condense the water vapor.

In yet additional embodiments, a reactor for producing a solid carbon material comprises an outer shell comprising at least one reaction gas inlet, at least one reaction product outlet, at least one catalyst material inlet, and at least one catalyst material outlet, at least one reaction chamber at least partially defined by the outer shell and configured to produce a solid carbon material and water vapor through a reduction reaction between at least one carbon oxide and at least one gaseous reducing material in the presence of at least one layer of catalyst material, and at least one porous material structure coupled to a surface of the outer shell within the at least one reaction chamber and configured to support the at least one layer of catalyst material.

In further embodiments, a reactor for producing a solid carbon material comprises an outer shell comprising at least one reaction gas inlet, at least one reaction product outlet, at least one catalyst material inlet, and at least one catalyst material outlet, at least one reaction chamber at least partially defined by the outer shell and configured to produce a solid carbon material and water vapor through a reduction reaction between at least one carbon oxide and at least one gaseous reducing material in the presence of at least a portion of at least one catalyst material structure, and a conveying mechanism configured to transport the at least one catalyst material structure through the at least one reaction chamber.

In yet further embodiments, a method of producing a solid carbon material comprises introducing at least one carbon oxide and at least one gaseous reducing material into at least one reaction chamber of a reactor, the at least one reaction chamber configured to produce at least one solid carbon material and water through at least one of a Bosch reaction, a Boudouard reaction, and a methane reduction reaction between the at least one carbon oxide and the at least one gaseous reducing material in the presence of at least one catalyst material. The at least one carbon oxide and the at least one reducing agent are reacted within the at least one reaction chamber to produce the at least one solid carbon material and the water.

In yet still further embodiments, a method of forming reactor for producing a solid carbon product comprises forming an outer shell defining at least one reaction chamber configured to produce at least one solid carbon material and water through at least one of a Bosch reaction, a Boudouard reaction, and a methane reduction reaction between at least one carbon oxide and at least one gaseous reducing material in the presence of at least one catalyst material.

BRIEF DESCRIPTION OF THE DRAWINGS

FIGS. 4A and 4B are simplified side-elevation, and cross-sectional views of another reactor for producing solid carbon material, in accordance with another embodiment of the disclosure;

FIGS. 5A and 5B are simplified side-elevation, and cross-sectional views of another reactor for producing solid carbon material, in accordance with yet another embodiment of the disclosure;

FIGS. 6A and 6B are simplified side-elevation, and cross-sectional views of another reactor for producing solid carbon material, in accordance with yet another embodiment of the disclosure;

MODE(S) FOR CARRYING OUT THE INVENTION

Figure 35:
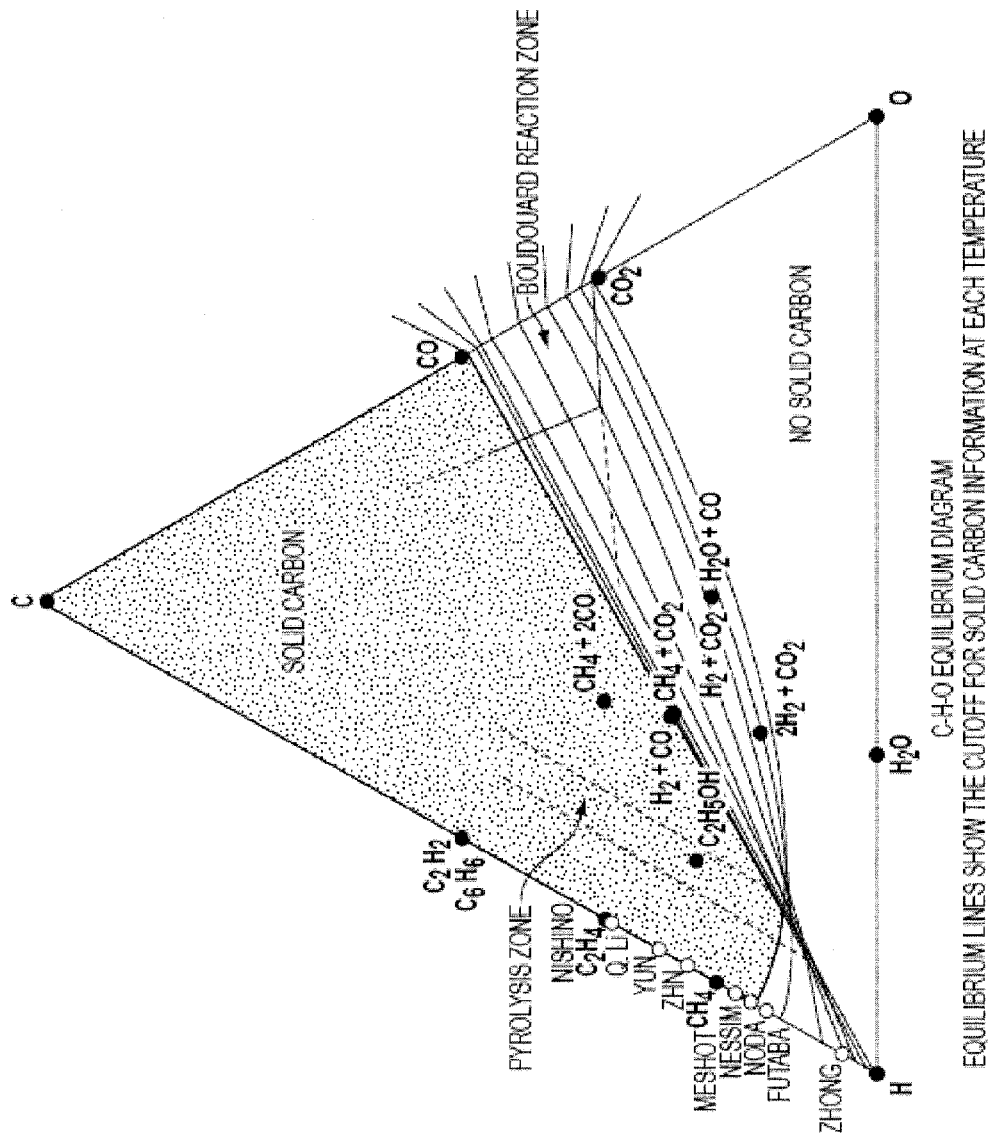
FIG. 35 is a C—H—O equilibrium diagram.

Reactors for producing at least one solid carbon material are described, as are related methods. The reactors and methods of the disclosure facilitate the efficient production of the solid carbon material by way of a reduction reaction between at least one carbon oxide (e.g., carbon monoxide, or carbon dioxide), and at least one gaseous reducing material (e.g., a gaseous hydrogen-containing reducing material, such as hydrogen, methane, etc.) in the presence of a catalyst. The reduction reaction may occur within the interior region of the C—H—O phase diagram shown in FIG. 35, wherein an equilibrium may be established between solid carbon, compounds of carbon, hydrogen, and oxygen. The interior region of the C—H—O phase diagram includes several points favorable for the formation of CNTs, as well as other forms of solid carbon. Processing conditions (e.g., temperature, pressure, reaction gas mixture, water vapor pressure in the reaction gas mixture, and residence time) within the reactors may be varied to achieve a desired morphology or configuration (e.g., shape, size) of the solid carbon material. The reactors and methods of the disclosure advantageously enable efficient ways of producing valuable solid carbon materials including, but not limited to, CNTs.

The following description provides specific details, such as catalyst types, stream compositions, and processing conditions (e.g., temperatures, pressures, flow rates, reaction gas mixtures, etc.) in order to provide a thorough description of embodiments of the disclosure. However, a person of ordinary skill in the art will understand that the embodiments of the present disclosure may be practiced without employing these specific details. Indeed, the embodiments of the disclosure may be practiced in conjunction with conventional systems and methods employed in the industry. In addition, only those process components and acts necessary to understand the embodiments of the disclosure are described in detail below. A person of ordinary skill in the art will understand that some process components (e.g., pipelines, line filters, valves, temperature detectors, flow detectors, pressure detectors, and the like) are inherently disclosed herein as being in common practice in the chemical industry and that adding various conventional process components and acts would be in accord with the disclosure. The drawings accompanying the disclosure are for illustrative purposes only, and are not meant to be actual views of any particular material, reactor, or system. Additionally, elements common between figures may retain the same numerical designation.

As used herein, the term "configured" refers to a shape, material composition, and arrangement of one or more of at least one structure and at least one apparatus facilitating operation of one or more of the structure and the apparatus in a pre-determined or intended way.

A reactor of the disclosure may be configured and operated to form various morphologies of solid carbon material from at least one carbon oxide (e.g., carbon dioxide, carbon monoxide, or a combination thereof) and at least one gaseous reducing material. The carbon oxide may be obtained from the combustion of a primary hydrocarbon, from the atmosphere (e.g., air), or from some other source. The gaseous reducing material may be a known reducing material that undergoes a chemical reaction with the carbon oxide in the presence of at least one catalyst within the reactor to form the solid carbon material, as described in further detail below.

As a non-limiting example, the gaseous reducing material may be a hydrocarbon gas (e.g., a lower hydrocarbon alkane, such as methane, ethane, propane, butane, pentane, hexane, etc.), a hydrogen ($H_2$) gas, or a combination thereof. If utilized, the hydrocarbon gas may serve as both the gaseous reducing material and as a source of additional carbon material. In one or more embodiments, at least a portion of the carbon oxide and the gaseous reducing material may be delivered to the reactor as synthesis gas ("syngas"). Syngas includes large amounts of CO and $H_2$, as well as small amounts of other materials, such as $CO_2$, and $N_2$. The $N_2$ may be removed from the syngas prior to delivery into the reactor, or at least a portion of the $N_2$ may be fed into the reactor to produce ammonia ($NH_3$) in addition to the solid carbon material. In some embodiments, the at least one gaseous reducing material is a combination of methane ($CH_4$) and $H_2$.

In some embodiments, the reactor may be configured and operated to form solid carbon and water ($H_2O$) from a Bosch reaction between $CO_2$ and $H_2$, according to the equation:

$$CO_{2(g)} + 2H_{2(g)} \leftrightarrow C_{(s)} + H_2O_{(g)} \tag{1}$$

The Bosch reaction represented by Equation 1 may be exothermic. As a non-limiting example, if used to form CNTs, the Bosch reaction may facilitate a thermal energy output of about 24.9 kcal/mol at 650° C. (i.e., a heat of formation ($\Delta H$) of about −24.9 kcal/mol). As another non-limiting example, if used to form graphite, the Bosch reaction may facilitate a thermal energy output of about 23.8 kcal/mol at 650° C. (i.e., a $\Delta H$ of about −23.8 kcal/mol). As yet still another non-limiting example, if used to form buckminsterfullerenes, the Bosch reaction may facilitate a thermal energy output of about 13.6 kcal/mol at 650° C. (i.e., a $\Delta H$ of about −13.6 kcal/mol). The formation of carbon lamp black in the Bosch reaction is endothermic, consuming approximately 147.5 kcal/mol at 650° C. (i.e., $\Delta H$ is +147.5 kcal/mol).

The Bosch reaction of Equation 1 may be broken up into two steps, according to the equations:

$$CO_{2(g)} + H_{2(g)} \leftrightarrow CO_{(g)} + H_2O_{(g)} \tag{2}$$

$$CO_{(g)} + H_{2(g)} \leftrightarrow C_{(s)} + H_2O_{(g)} \tag{3}$$

In the first step of the Bosch reaction, shown in Equation 2, $CO_2$ reacts with $H_2$ to create CO and $H_2O$ in an endothermic reaction. The endothermic reaction may utilize a thermal energy input of about 8.47 kcal/mol at 650° C. In the second step of the Bosch reaction, shown in Equation 3, CO reacts with $H_2$ to form solid carbon and $H_2O$ in an exothermic reaction. By way of non-limiting example, if used to form CNTs, the exothermic reaction may facilitate a thermal energy output of about 33.4 kcal/mol ($1.16 \times 10^4$ joules/gram of $C_{(s)}$) at 650° C. $\Delta H$ values for other solid carbon products (e.g., graphite, graphene, carbon black, fibrous carbon, buckminsterfullerenes, etc.) may be determined by the difference between the $\Delta H$ value for Equation 1 for a particular solid carbon product and the $\Delta H$ value for Equation 2. The exothermic reaction may occur with stoichiometric amounts of reactants, or with an excess amount of one of $CO_2$ and $H_2$.

In additional embodiments, the reactor may be configured and operated to augment the formation of solid carbon through the Bosch reaction using disproportionation of CO into solid carbon and $CO_2$ by way of a Boudouard reaction (i.e., a reduction-oxidation reaction), according to the equation:

$$2CO_{(g)} \leftrightarrow CO_{(s)} + CO_{2(g)} \tag{4}$$

The Boudouard reaction of Equation 4 may be exothermic at temperatures less than or equal to about 700° C. As a non-limiting example, if used to form CNTs, the Boudouard reaction may facilitate a thermal energy output of about 41.9 kcal/mol at 650° C. (i.e., a heat of formation ($\Delta H$) of about −41.9 kcal/mol). As another non-limiting example, if used to form graphite, the Boudouard reaction may facilitate a thermal energy output of about 40.8 kcal/mol at 650° C. (i.e., a $\Delta H$ of about −40.8 kcal/mol). As yet still another non-limiting example, if used to form buckminsterfullerenes, the Boudouard reaction may facilitate a thermal energy output of about 30.5 kcal/mol at 650° C. (i.e., a $\Delta H$ of about −30.5 kcal/mol). At low temperatures, the Boudouard reaction may have a negative Gibbs free energy ($\Delta G$), and the production of solid carbon and $CO_2$ may be spontaneous. At higher temperatures, $\Delta G$ for the Boudouard Reaction may be positive, such that the reverse reaction is spontaneous. The temperature at which $\Delta G$ is zero (i.e., the temperature above which the reverse Boudouard reaction is spontaneous, and below which the forward Boudouard reaction is spontaneous) may depend on the form of carbon produced. As a non-limiting example, $\Delta G$ may equal zero at about 450° C. for buckminsterfullerenes, or at about 700° C. for CNTs. Accordingly, reaction conditions within the reactor may be tailored to facilitate the forward Boudouard reaction (e.g., temperatures may be maintained below about 700° C.).

In additional embodiments, the reactor may be configured and operated to form solid carbon and $H_2O$ from a methane ($CH_4$) reduction reaction, according to the equation:

$$CO_{2(g)} + CH_{4(g)} \leftrightarrow 2C_{(s)} + 2H_2O_{(g)} \tag{5}$$

The methane reduction reaction of Equation 5 may be exothermic, and may facilitate a thermal energy output of about 3.65 kcal/mol at standard conditions (25° C.). The methane reduction reaction of Equation 5 may be broken up into two steps, according to the equations:

$$CH_{4(g)} + CO_{2(g)} \leftrightarrow 2CO_{(g)} + 2H_{2(g)} \tag{6}$$

$$CO_{(g)} + H_{2(g)} \leftrightarrow C_{(s)} + H_2O_{(g)} \tag{7}$$

One or more of the reactions shown in Equations 1 through 7 above may occur in at least one reaction chamber, for example, of the reactor.

The reaction chamber of the reactor may be configured and operated to have and withstand an operating temperature of greater than or equal to about 400° C., such as greater than or equal to about 650° C. (e.g., up to about 1200° C.). The operating temperature of the reaction chamber may at least partially depend on the composition of at least one catalyst material operatively associated with the reactor and the average grain size of the catalyst material. For example, catalyst materials having small particle sizes generally exhibit optimum reaction temperatures at lower temperatures than the same catalyst materials having larger particle sizes. As a non-limiting example, the Bosch reaction of Equation 1 may occur at temperatures within a range of from about 400° C. to about 800° C. for iron-based catalysts, depending on the grain size and composition of the iron-based catalyst used, and the desired form of the at least one solid carbon material.

In general, graphite and amorphous solid carbon form at lower temperatures, and CNTs form at higher temperatures. CNTs may form at temperatures above about 600° C. In some embodiments, the operating temperature of the reaction chamber of the reactor is greater than or equal to about 650° C. The reaction chamber may be maintained at a desired operating temperature by heating at least one of the temperature of material streams (e.g., a stream containing at least one of the carbon oxide and the gaseous reducing material entering) entering the reactor, and one or more integrated heating devices (e.g., a flame ignited heater, an electrical resistance heater, an inductive heater, an electromagnetic heater, etc.). In addition, the reaction chamber may be configured and operated to have an operating pressure within a range from about 0 psi (i.e., about 0 pascal) to about 1000 psi (i.e., about $6.90 \times 10^6$ pascal), such as from about 0 psi (i.e., about 0 pascal) to about 600 psi (i.e., about $4.14 \times 10^6$ pascal).

Solid carbon nanotubes may, for example, form in pressure ranges of from near vacuum (i.e., about 0 pascal) to about 900 psi (i.e., about $6.21 \times 10^6$ pascal), such as from about 50 psi (i.e., about $3.45 \times 10^5$ pascal) to about 600 psi (i.e., about $4.14 \times 10^6$ pascal). Increasing the operating pressure may increase reaction rate. The reactor may additionally be configured and operated such that a residence time within the reaction chamber is within a range of from about $1 \times 10^{-4}$ seconds to about $1 \times 10^4$ seconds, such as from about $1 \times 10^{-3}$ seconds to about 1000 seconds, or from about 0.01 seconds to about 500 seconds. The residence time in the reaction chamber may be at least partially controlled by one or more forces (e.g., gravitational forces, electromagnetic forces, centrifugal forces, etc.).

The catalyst material operatively associated with the reaction apparatus may be a material catalyzing the formation of the solid carbon material from the carbon oxide and the gaseous reducing material. The catalyst material may accelerate a reaction rate of at least one of Equations 2, 3, 4, 6, and 7 above, which may improve economy of operation. Different catalysts may enable the formation of different types of solid carbon under similar reaction conditions. For example, appropriate selection of catalyst may enable the solid carbon material to have a smaller size (e.g., smaller diameter CNTs), or to have larger size (e.g., larger diameter CNTs). The catalyst material may also enable the reaction chamber of the reactor to be operated at lower temperatures for a desired solid carbon product. As a non-limiting example, the catalyst material may be an element of Group VI, Group VII, or Group VIII of the Periodic Table of Elements (e.g., iron, nickel, molybdenum, platinum, chromium, cobalt, tungsten, etc.), an actinide, a lanthanide, oxides thereof, alloys thereof, or combinations thereof. Any metal known to be subject to metal dusting may also be suitable for use as the catalyst material.

Various grades of the catalyst material may be used. For example, the catalyst material may be a grade of an iron-, chromium-, molybdenum-, cobalt-, tungsten-, or nickel-containing alloy or superalloy. Such materials commercially available from numerous sources, such as from Special Metals Corp., of New Hartford, N.Y., under the trade name INCONEL®, or from Haynes, Intl, Inc., of Kokomo, Ind., under the trade name HASTELLOY® (e.g., HASTELLOY® B-2, HASTELLOY® B-3, HASTELLOY® C-4, HASTELLOY® C-2000, HASTELLOY® C-22, HASTELLOY® C-276, HASTELLOY® G-30, HASTELLOY® N, or HASTELLOY® W). In some embodiments, the catalyst material is steel of a low chromium grade.

The catalyst material may be provided within the reactor (e.g., within the reaction chamber) as one or more of a solid structure (e.g., a wafer, cylinder, plate, sheet, sphere, pellet, mesh, fiber, etc.) and as at least a partial coating on another structure (e.g., particles of the at least one material deposited on a structure, such as a wafer, cylinder, plate, sheet, sphere, mesh, pellet, etc.) within the reactor. In some embodiments, the catalyst material may be provided within the reactor as a plurality of nanoparticles. As used herein, the term "nanoparticle" means and includes any particle having an average particle diameter of about 500 nm or less. Nanoparticles include grains of the catalyst material having an average grain size of about 500 nm or less. The nanoparticles of the catalyst material may be configured to increase the surface area of the catalyst material in contact with the at least one carbon oxide and the at least one reducing material as the reducing reaction (e.g., the Bosch reaction) proceeds. The catalyst material may be stationary (e.g., bound to at least one surface within the reactor) or mobile (e.g., unbound to surfaces within the reactor) within the reactor. In some embodiments, a portion of the catalyst material may be mobile within the reactor and another portion of the catalyst material may be stationary within the reactor.

When using a solid structure of the catalyst material, such as a solid wafer or solid sheet of the catalyst material, the solid carbon material may grow in a series of generations. By way of non-limiting example, CNTs may form clumps, pillows, forests, fibers, piles, etc., as described in U.S. Pat. No. 8,679,444, issued Mar. 25, 2014, entitled "Method for Producing Solid Carbon by Reducing Carbon Oxides," previously incorporated by reference. In addition, when the catalyst material is coated on an object of manufacture (i.e., another structure), an entire surface of the object of manufacture need not be uniformly covered by the solid carbon material. For example, formation of the solid carbon material may be limited to one or more regions along the surface of the object of manufacture by masking, or by selectively depositing the catalyst material on an object of manufacture to promote the formation of the solid carbon material at select locations along the surface of the object of manufacture.

In some embodiments, the catalyst material may be provided within the reactor by introducing (e.g., injecting, spraying through a atomizing nozzle, electrostatic spraying, dispersing from a surface of a rotating fixture) a catalyst solution including the catalyst material and at least one solvent (e.g., water) into the reactor (e.g., by way of an atomization nozzle), and heating the catalyst solution to evaporate the solvent and form the catalyst material. In further embodiments, the catalyst material may be provided within the reactor by way of decomposition of at least one catalyst precursor. The catalyst precursor may be selected such that a decomposition temperature of the catalyst precursor is below a temperature within the reactor. Upon introduction to the reactor, the catalyst precursor may decompose to form the catalyst material. As a non-limiting example, the at least one catalyst precursor (e.g., at least one metal acetate) may be dissolved in a solvent (e.g., ethanol) to form a catalyst precursor solution. The catalyst precursor solution may supplied (e.g., sprayed) into the reactor and heated to the decomposition temperature of the catalyst precursor to form the catalyst material. Forming the catalyst material in situ may control catalyst material size (e.g., particles or grains of the catalyst material may be kept to a small and uniform size). In yet additional embodiments, the catalyst material may be entrained in powder form in a carrier gas and introduced into the reactor. The powder may be formed from a pulverization and sieving process of the catalyst material, which may enhance a size uniformity of grains (e.g., nanoparticles) of the catalyst material.

If desired, the catalyst material may be provided on at least one surface within the reactor by sufficiently heating the surface such that the catalyst material bonds or couples thereto. The surface may be integral with the reactor or may be distinct from the reactor. The surface may, for example, include a surface of at least one structure (e.g., plate, cylinder, pellet, sphere, etc.) within the reactor. In one or more embodiments, the catalyst material may be formed on the surface within the reactor by way of a vacuum deposition process at high negative pressures (e.g., from about $10^{-6}$ Torr to about $10^{-8}$ Torr) and high temperatures (e.g., from about 900° C. to about 1300° C.).

The composition, average grain size, and average grain boundary shape of the catalyst material within the reactor may be tailored to achieve desired morphologies (e.g., shapes and sizes) of the solid carbon material. The solid carbon material (e.g., CNTs) may grow from grains of the catalyst material (e.g., the grains of the at least one catalyst material may serve as nucleation sites). Morphologies of the solid carbon material may, therefore, be related to each of the average grain size and the average grain boundary shape of the catalyst material. A ratio between the grain size of the catalyst material and a diameter of a formed CNT may be within a range of from about 1.2 to about 1.6. Without being bound to a particular theory, a possible theoretical basis for the correlation of catalyst material grain size and CNT diameter has been disclosed in Nasibulin et al., *Correlation between catalyst particle and single-walled carbon nanotube diameters*, 43 CARBON 2251-57 (2005). Smaller grain sizes of the catalyst material may produce smaller diameter CNTs. The average grain size of the catalyst material may be a function of both the chemical characteristics of the catalyst material and the methodologies (e.g., thermal treatment methods) under which the catalyst material is provided within the reactor.

A grain structure of the catalyst material may be modified by conventional methods, which are not described in detail herein. As a non-limiting example, the catalyst material may be heated to a temperature sufficient to recrystallize the catalyst material to form randomly oriented multiple grains. As used herein, the term "recrystallization" means and includes a process in which the catalyst material (e.g., a metal structure) may be plastically deformed, annealed, or otherwise heat-treated to affect grain growth of the catalyst material. The catalyst material may also be annealed to change at least one of the grain boundary shapes and the grain size of the catalyst material. As a non-limiting example, the catalyst material may be annealed by heating the catalyst material to a temperature above a recrystallization temperature thereof, maintaining the temperature for a period of time, then cooling the catalyst material. The size of the resulting grain structure may at least depend upon a recrystallization temperature of the catalyst material and an amount of time the catalyst material is exposed to a temperature greater than or equal to the recrystallization temperature. In addition, a rapid cooling rate from the recrystallization temperature may facilitate increased maximum undercooling and increased nucleation sites, enabling smaller grain sizes of the catalyst material.

The grains of the catalyst material may be monodisperse, wherein all of the grains are of substantially the same size, or may be polydisperse, wherein the grains have a range of sizes and are averaged. The grains of the catalyst material may each have substantially the same grain boundary shape, or at least some of the grains of the catalyst material may have a substantially different grain boundary shape. A grain distribution of the catalyst material, including grain sizes and the grain boundary shapes, may be controlled by methods known in the art. For example, grain size may be controlled by controlling the nucleation of the catalyst material, such as by grain refinement or inoculation. Inoculants for promoting nucleation may include titanium, boron, aluminum titanium ($Al_3Ti$), titanium diboride ($TiB_2$), etc. Nucleation of the catalyst material may also be promoted using pulsed laser light, such as by passing pulses through the catalyst (and through the at least one catalyst precursor, if present). The use of pulsed laser light may enhance grain size uniformity of the catalyst material.

The catalyst material within the reactor may be preconditioned prior to exposure to the carbon oxide and the gaseous reducing material. By way of non-limiting example, the catalyst material may be heated in an inert carrier gas. Heating the catalyst material in an inert carrier gas may, for example, promote the growth of specific chiralities of single wall CNTs (e.g., helium is known to promote the growth of chiralities with metallic properties).

The reactor may be configured and operated so that physical properties of the solid carbon material formed by the reaction of the carbon oxide and the gaseous reducing material in the presence of the catalyst material may, optionally, be modified prior to removing the solid carbon material from the reactor. By way of non-limiting example, if desired, at least one modifying agent (e.g., ammonia, thiophene, nitrogen gas, and/or surplus hydrogen) may be introduced into the reaction chamber of the reactor during the formation of the solid carbon material to modify the physical properties of the solid carbon material. For example, surplus hydrogen may result in the hydrogenation of the solid carbon material, resulting in a significant yield of semiconductor species of the solid carbon material. In addition, small amounts of other modifying agents (e.g., sulfur) may serve as catalyst promoters that accelerate the growth of the solid carbon material on the catalyst material. Such catalyst promoters may be introduced into the reactor using a varity of compounds. If, for example, sulfur is selected as a catalyst promoter for an iron-based catalyst material, the sulfur may be introduced into the reactor as a thiophene gas, or as thiophene droplets. Examples of sulfur-containing catalyst promoters include thiophene, hydrogen sulfide, heterocyclic sulfide, and inorganic sulfide. Other promoters include lead compounds and bismuth. The modifying agent may, for example, be introduced into the reactor as a component of at least one stream containing the carbon oxide and the gaseous reducing material. The modifying agent may also be introduced into the reactor by delivering a separate stream containing the modifying agent into the reactor.

A wide variety of reactor designs and configurations may facilitate the formation of the solid carbon material from the carbon oxide and the gaseous reducing material. The reactor may be configured and operated to increase the exposed surface area of the catalyst material to the carbon oxide and the gaseous reducing material. The reactor may also be configured to enable the elutriation or sloughing off of the solid carbon material from the catalyst material, facilitating a substantially continuous operation of the reactor. The reactor may be a batch reactor or may be a continuous reactor. The reactor may, for example, be a thermosiphon reactor, a thin bed reactor, or a ribbon reactor, as described in further detail below.

Figure 1:
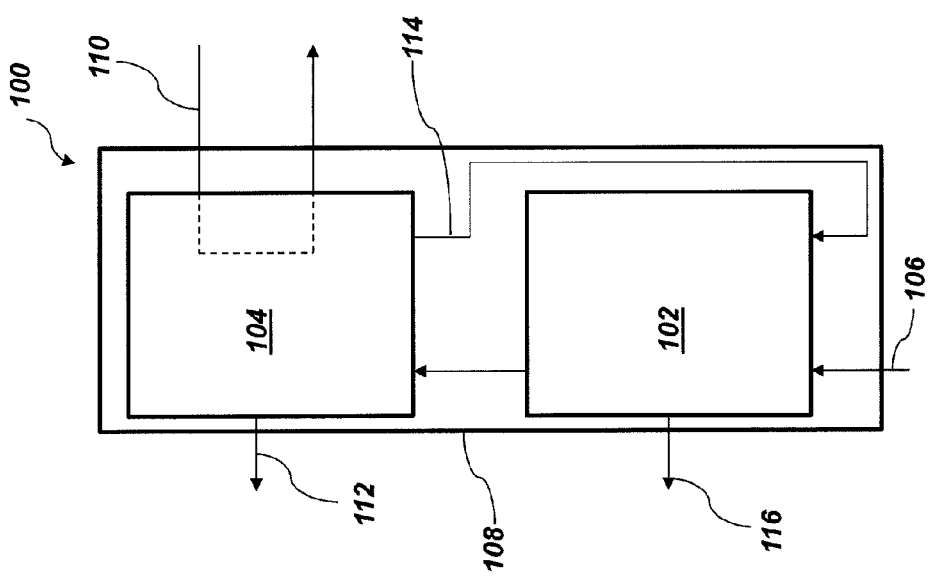

An embodiment of a reactor of the disclosure will now be described with reference to FIG. 1, which illustrates a simplified cross-sectional view of a reactor 100. The reactor 100, which may be considered a thermosiphon reactor, may include at least one reaction chamber 102 and at least one cooling chamber 104. The reaction chamber 102 is configured and operated to produce a solid carbon material and water through at least one of the reduction reactions of Equations 1, 4, and 5 above. The reaction chamber 102 includes the catalyst material previously described above, and may be operatively associated with the cooling chamber 104, at least one reaction gas inlet 106, and at least one reaction product outlet 116. The reaction chamber 102 may be configured and operated to have an operating temperature of within a range of from about 450° C. to about 1200° C., such as from about 450° C. to about 1000° C., or from about 500° C. to about 900° C., and to have an operating pressure within a range from about 0 psi (i.e., about 0 pascal) to about 900 psi (i.e., about $6.21\times10^6$ pascal), such as from about 0 psi (i.e., about 0 pascal) to about 600 psi (i.e., about $4.14\times10^6$ pascal).

The cooling chamber 104 may be configured and operated to condense water vapor in unreacted reaction gases received from the reaction chamber 102. The cooling chamber 104 may be operatively associated or communicate with the reaction chamber 102 by way of at least one effluent gas line 108 and at least one gas return line 114. Each of the effluent gas line 108 and the return gas line 114 may extend between the reaction chamber 102 and the cooling chamber 104. In addition, the cooling chamber 104 may be operatively associated with at least one coolant line 110 configured and operated to decrease the temperature within the cooling chamber 104 using at least one exchange fluid (e.g., air, water, a conventional refrigerant, etc.). The cooling chamber 104 may further include at least one outlet 112 configured to remove condensed water from the cooling chamber 104. The cooling chamber 104 may be configured and operated to have an operating temperature of less than or equal to about 50° C., such as within a range of from about 50° C. to about −22° C.

In operation, reaction gases, such as the carbon oxide and the gaseous reducing material previously described, may be supplied to the reaction chamber 102 of the reactor 100 by way of the reaction gas inlet 106. The reaction gases may be preheated before introduction into reaction gas inlet 106, may be preheated within the reaction gas inlet 106, or may be preheated within the reaction chamber 102 (e.g., by way of a zone or device configured to preheat the reaction gases). Within the reaction chamber 102, the reaction gases are mixed in the presence of the catalyst material to form the solid carbon material and water (e.g., by way of one or more of the reduction reactions of Equations 1, 4, and 5, as previously described). A reaction product stream including the solid carbon material may exit the reaction chamber 102 by way of the reaction product outlet 116. A temperature differential between the operating temperature of the reaction chamber 102 and the operating temperature of the cooling chamber 104 facilitates a thermosiphon effect to draw unreacted gases and at least some reaction products, such as water vapor, from the reaction chamber 102 and into the cooling chamber 104 through the effluent gas line 108. Water formed in the reaction chamber 102 may also diffuse into the cooling chamber 104 through the effluent gas line 108 because of the lower water vapor pressure in the cooling chamber 104 due to the condensation of water within the cooling chamber 104. Within the cooling chamber 104, the unreacted gases and reaction products may be cooled using the coolant line 110 to condense water vapor, which may then be removed through the outlet 112. Cooled unreacted gases and reaction products remaining in the cooling chamber 104 may be directed back into the reaction chamber 102 through the gas return line 114. The flow velocities of the unreacted gases and reaction products within the cooling chamber 104 may be sufficiently low as to substantially limit or prevent water entrainment in the cooled unreacted gases and reaction products exiting the cooling chamber 104. Water may, therefore, be removed with a minimal impact upon the efficiency of the reactor 100.

Figure 2:
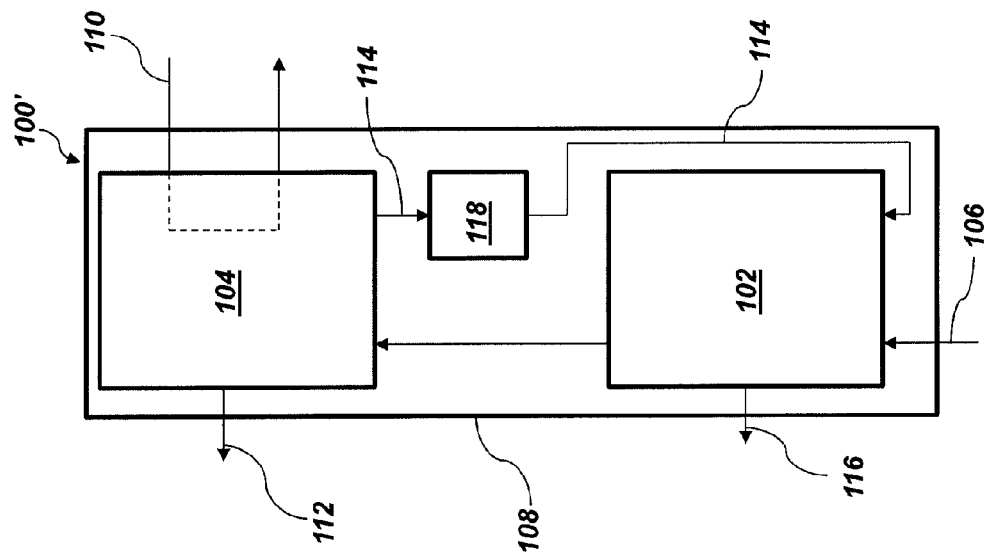
FIGS. 1-3 are simplified cross-sectional views of reactors for producing solid carbon material, in accordance with embodiments of the disclosure.

In further embodiments, the reactor 100 may be configured and operated as depicted in FIG. 2, in which a prime mover 118 (e.g., a blower, a fan, a compressor, etc.) may be included in the reactor 100'. The prime mover 118 may be operatively associated with each of the reaction chamber 102 and the cooling chamber 104. As a non-limiting example, as illustrated in FIG. 2, the prime mover 118 may be coupled to the gas return line 114. The prime mover 118 may be configured and operated to promote the flow of gases through the reactor 100. The prime mover 118 may, for example, be configured and operated to increase the pressure of the cooled unreacted gases and reaction products directed back into the reaction chamber 102 of the reactor 100'. Increasing the pressure of the cooled unreacted gases and reaction products may, for example, at least partially mitigate pressure losses (if any) resulting from the removal of the solid carbon material from the reactor 100'.

Figure 3:
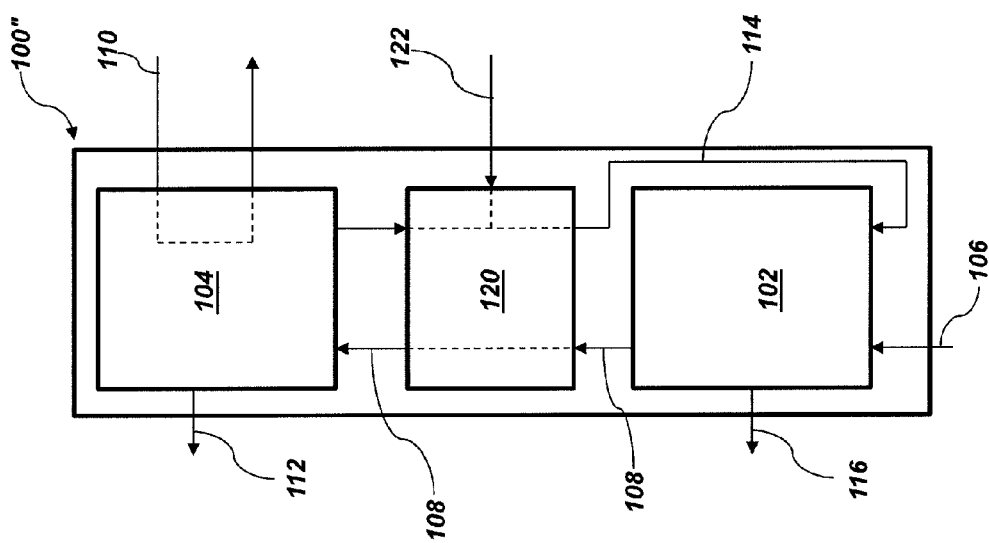

In yet further embodiments, the reactor 100 may be configured and operated as depicted in FIG. 3, in which a heat exchange zone 120 may be included in the reactor 100". The heat exchange zone 120, which may include at least one heat exchange device, may be operatively associated with each of the reaction chamber 102 and the cooling chamber 104. As a non-limiting example, as illustrated in FIG. 3, the heat exchange zone 120 may be located between the reaction chamber 102 and the cooling chamber 104, in operative association with each of the effluent gas line 108 and the gas return line 114. The heat exchange zone 120 may, for example, be configured and operated to decrease the temperature of the unreacted gases and reaction products flowing through the effluent gas line 108 before entry into the cooling chamber 104, and to increase the temperature of the cooled unreacted gases and reaction products flowing through the gas return line 114 prior to entry into the reaction chamber 102. In addition, as shown in FIG. 3, the heat exchange zone 120 may, optionally, be configured and operated to receive additional reaction gases (e.g., carbon oxide(s) and gaseous reduction material(s), such as those previously described) by way of at least one additional gas supply line 122. The additional reaction gases may, for example, be combined with the cooled unreacted gases and reaction products and may be directed into the reaction chamber 102 of the reactor 100".

Another embodiment of a reactor of the disclosure will now be described with reference to FIGS. 4A and 4B, which respectively illustrate side-elevation and cross-sectional views of a reactor 200. FIG. 4B illustrates a cross-sectional view of the reactor 200 taken about line A-A in FIG. 4A. Referring to FIG. 4A, the reactor 200, which may be considered a thin-bed reactor, includes an outer shell 202. The outer shell 202 may have any desired shape (e.g., spherical, semi-spherical, cylindrical, semi-cylindrical, tubular, quadrilateral, truncated versions thereof, or an irregular shape) and size. The outer shell 202 may include at least one reaction gas inlet 208, at least one reaction product outlet 210, at least one catalyst material inlet 212, and at least one catalyst material outlet 214. In some embodiments, the outer shell 202 is a cylindrical shell including at least two end caps (e.g., at least two hemispherical end caps), the reaction gas inlet 208 extending through at least one of the end caps, and the reaction product outlet 210 extending through at least one of other of the end caps. The reaction gas inlet 208 may be configured to receive reaction gases, such as the carbon oxide and the gaseous reducing material previously described. The reaction product outlet 210 may be configured to remove at least one of unreacted reaction gases (if any), and reaction products (e.g., the solid carbon material, water, etc.) from the reactor 200. The catalyst material inlet 212 and the catalyst material removal 214 may be configured to respectively receive and remove a form of the catalyst material previously described. The catalyst material outlet 214 may be operatively associated with at least one catalyst collection manifold (not shown).

Referring to FIG. 4B, the outer shell 202 may at least partially define at least one reaction chamber 215 of the reactor 200. The reaction chamber 215 is configured and operated to produce a solid carbon material and water through at least one of the reduction reactions of Equations 1, 4, and 5 above. The reaction chamber 215 includes at least one porous material structure 204 coupled to or integral with a surface of the outer shell 202, and at least one layer of catalyst material 206 on or over the porous material structure 204. Optionally, the reaction chamber 215 may further include at least one additional structure (not shown) configured to support the porous material structure 204. The porous material structure 204 is configured to provide support and access to the layer of catalyst material 206. A pore size of the porous material structure 204 may be sufficiently small as to substantially limit or prevent the passage of the catalyst material therethrough.

The porous material structure 204 may also include one or more penetrations facilitating removal of catalyst material from the reactor 200. The porous material structure 204 may separate or serve as a boundary between at least one reaction chamber region 216 and at least one other reaction chamber region 218. In some embodiments, at least one of the reaction chamber region 216 and the other reaction chamber region 218 may include baffling or distribution piping. If present, baffling within the reaction chamber region 216 may, for example, be configured to facilitate uniform distribution of the reaction gases within the reaction chamber region 216 (e.g., to substantially limit or prevent channeling of the reaction gases through the porous material structure 204 and the layer of catalyst material 206). In addition, if present, baffling within the other reaction chamber region 218 may, for example, be configured to facilitate separation of reaction products (e.g., the solid carbon material) from unreacted reaction gases, and/or to facilitate substantially uniform removal of the unreacted reaction gases and reaction products (e.g., the solid carbon material, water) entrained therein.

The reaction chamber 215 may be configured and operated to have an operating temperature of greater than or equal to about 450° C., such as greater than or equal to about 650° C., and to have an operating pressure within a range from about 0 psi (i.e., about 0 pascal) to about 900 psi (i.e., about $6.21 \times 10^6$ pascal), such as from about 0 psi (i.e., about 0 pascal) to about 600 psi (i.e., about $4.14 \times 10^6$ pascal). In addition, the reactor 200 may be configured to enable maintenance and replacement of one or more components of the reaction chamber 215 (e.g., the porous material structure 204, baffling within the reaction chamber region 216, baffling within the other reaction chamber region 218, etc.).

In operation, reaction gases, such as the carbon oxide and the gaseous reducing material previously described, may be supplied to the reactor 200 by way of the reaction gas inlet 208. The reaction gases may sequentially flow through the reaction chamber region 216, through each of the porous material structure 204 and the layer of catalyst material 206, and into the other reaction chamber region 218. As the reaction gases pass through the layer of catalyst material 206 at least a portion of the reaction gases are converted into the solid carbon material and water (e.g., by way of one or more of the reduction reactions of Equations 1, 4, and 5, as previously described). The solid carbon material may be removed from the reactor 200 by way of the reaction product outlet 210 (e.g., entrained in at least one of water vapor and unreacted reaction gases) and/or another means (e.g., removal or cleaning of baffling, if present, within the other reaction chamber region 218). Catalyst material may be delivered to and removed from the reactor 200 as desired by way of, for example, the catalyst material inlet 212 and the catalyst material outlet 214, respectively. The delivery and removal of the catalyst material may at least partially depend on catalyst material particle size and bed fluidity.

In additional embodiments, the reactor 200 may be configured and operated as depicted in FIGS. 5A and 5B, which respectively illustrate side-elevation and cross-sectional views of a reactor 200' including a plurality of reaction chambers 215' (FIG. 5B). FIG. 5B illustrates a cross-sectional view of the reactor 200' taken about line B-B in FIG. 5A. Referring to FIG. 5A, the reactor 200' includes an outer shell 202'. The outer shell 202' may have any desired shape (e.g., spherical, semi-spherical, cylindrical, semi-cylindrical, tubular, quadrilateral, truncated versions thereof, or an irregular shape) and size. In addition, the outer shell 202' may include a plurality of reaction gas inlets 208', a plurality of reaction product outlets 210', a plurality of catalyst material inlets 212', and a plurality of catalyst material outlets 214'. The plurality of reaction gas inlets 208' may be interconnected (see FIG. 4B), and each of plurality of reaction gas inlets 208' may be substantially similar to the reaction gas inlet 208 described with respect to FIGS. 4A and 4B. Similarly, the plurality of reaction product outlets 210' may interconnect (see FIG. 4B), and each of plurality of reaction product outlets 210' be substantially similar to the reaction product outlet 210 described with respect to FIGS. 4A and 4B. In addition, the plurality of catalyst material inlets 212' may be interconnected, and each of the plurality of catalyst material inlets 212' may be substantially similar to the catalyst material inlet 212 described with respect to FIGS. 4A and 4B. Further, the plurality of catalyst material outlets 214' may be interconnected, and each of the plurality of catalyst material outlets 214' may substantially similar to the catalyst material outlet 214 described with respect to FIGS. 4A and 4B.

Referring to FIG. 5B, the outer shell 202' may at least partially define the plurality of reaction chambers 215'. The plurality of reaction chambers 215' may include at least two reaction chambers. The plurality of reaction chambers 215' may be operatively associated with the plurality of reaction gas inlets 208', the plurality of reaction product outlets 210', the plurality of catalyst material inlets 212', and the plurality of catalyst material outlets 214' (FIG. 5A). Each of the plurality of reaction chambers 215' may be substantially similar to the reaction chamber 215 described with respect to FIG. 4B. For example, as illustrated in FIG. 5B, each of the plurality of reaction chambers 215' may include the porous material structure 204, the layer of catalyst material 206, the reaction chamber region 216, and the other reaction chamber region 218. The porous material structure 204 of each of the plurality of reaction chambers 215' may be coupled to or integral with the outer shell 202'. Optionally, each of the plurality of reaction chambers 215' may further include at least one additional structure (not shown) configured to support the porous material structure 204. In some embodiments, at least one of the reaction chamber region 216 and the other reaction chamber region 218 of one of more of the plurality of reaction chambers 215' may include baffling or distribution piping.

Each of the plurality of reaction chambers 215' may be configured and operated to have an operating temperature of greater than or equal to about 450° C., such as greater than or equal to about 650° C., and to have an operating pressure within a range from about 0 psi (i.e., about 0 pascal) to about 900 psi (i.e., about $6.21 \times 10^6$ pascal), such as from about 0 psi (i.e., about 0 pascal) to about 600 psi (i.e., about $4.14 \times 10^6$ pascal). In addition, the reactor 200' may be configured as to enable maintenance and replacement of one or more components of each of the plurality of reaction chambers 215' (e.g., the porous material structure 204, baffling within the reaction chamber region 216, baffling within the other reaction chamber region 218, etc.).

Another embodiment of a reactor of the disclosure will now be described with reference to FIGS. 6A and 6B, which respectively illustrate side-elevation and cross-sectional views of a reactor 300. FIG. 6B illustrates a cross-sectional view of the reactor 300 taken about line C-C in FIG. 6A. Referring to FIG. 6A, the reactor 300, which may also be considered a thin-bed reactor, includes an outer shell 302. The outer shell 302 may have any desired shape (e.g., spherical, semi-spherical, cylindrical, semi-cylindrical, tubular, quadrilateral, truncated versions thereof, or an irregular shape) and size. The outer shell 302 may include at least one reaction gas inlet 308 (FIG. 6B), at least one reaction product outlet 310, at least one catalyst material inlet 312, and at least one catalyst material outlet 314.

The reaction gas inlet 308 may be configured to receive reaction gases, such as the carbon oxide and the gaseous reducing material previously described. The reaction product outlet 310 may be configured to remove at least one of unreacted reaction gases (if any), and reaction products (e.g., the solid carbon material, water, etc.) from the reactor 300. The catalyst material inlet 312 and the catalyst material removal 314 may be configured to respectively receive and remove the catalyst material previously described. The catalyst material outlet 314 may be operatively associated with at least one catalyst collection manifold (not shown).

Referring to FIG. 6B, the outer shell 302 may at least partially define at least one reaction chamber 315 of the reactor 300. The reaction chamber 315 is configured and operated to produce a solid carbon material and water through at least one of the reduction reactions of Equations 1, 4, and 5 above. The reaction chamber 315 includes at least one porous material structure 304, at least one other porous material structure 305, and at least one layer of catalyst material 306. Each of the porous material structure 304 and the other porous material structure 305 may be coupled to or integral with a surface of the outer shell 302. The layer of catalyst material 306 may be located between the porous material structure 304 and the other porous material structure 305. Optionally, the reaction chamber 315 may further include at least one additional structure (not shown) configured to support at least one of the porous material structure 304 and the other porous material structure 305. The porous material structure 304 and the other porous material structure 305 may each be configured to provide support and access to the layer of catalyst material 306. A pore size for each of the porous material structure 304 and the other porous material structure 305 may be sufficiently small as to substantially limit or prevent the passage of the catalyst material therethrough. At least one of the porous material structure 304 and the other porous material structure 305 may also include one or more penetrations facilitating removal of catalyst material from the reactor 300. The porous material structure 304 and the other porous material structure 305 may separate or serve as a boundary between at least one reaction chamber region 316 and at least one other reaction chamber region 318. In some embodiments, at least one of the reaction chamber region 316 and the other reaction chamber region 318 may include baffling or distribution piping.

The reaction chamber 315 may be configured and operated to have an operating temperature of greater than or equal to about 450° C., such as greater than or equal to about 650° C., and to have an operating pressure within a range from about 0 psi (i.e., about 0 pascal) to about 900 psi (i.e., about $6.21 \times 10^6$ pascal), such as from about 0 psi (i.e., about 0 pascal) to about 600 psi (i.e., about $4.14 \times 10^6$ pascal). In addition, the reactor 300 may be configured as to enable maintenance and replacement of one or more components of the reaction chamber 315 (e.g., the porous material structure 304, baffling within the reaction chamber region 316, baffling within the other reaction chamber region 318, etc.).

In operation, reaction gases, such as the carbon oxide and the gaseous reducing material previously described, may be supplied to the reactor 300 by way of the reaction gas inlet 308. The reaction gases may sequentially flow through the reaction chamber region 316, through each of the porous material structure 304, the layer of catalyst material 306, and the other porous material structure 305, and into the other reaction chamber region 318. As the reaction gases pass through the layer of catalyst material 306 at least a portion of the reaction gases are converted into the solid carbon material and water (e.g., by way of one or more of the reduction reactions of Equations 1, 4, and 5, as previously described). The solid carbon material may be removed from the reactor 300 by way of the reaction product outlet 310 (e.g., entrained in at least one of water vapor and unreacted reaction gases) and/or another means (e.g., removal or cleaning of baffling, if present, within the other reaction chamber region 318, removal from at least one outlet between the porous material structure 304 and the other porous material structure 305, etc.). Catalyst material may be delivered to and removed from the reaction chamber 315 of the reactor 300 as desired by way of, for example, the catalyst material inlet 312 (FIG. 6A) and the catalyst material outlet 314, respectively. The delivery and removal of the catalyst material may at least partially depend on catalyst material particle size and bed fluidity.

Figure 7B:
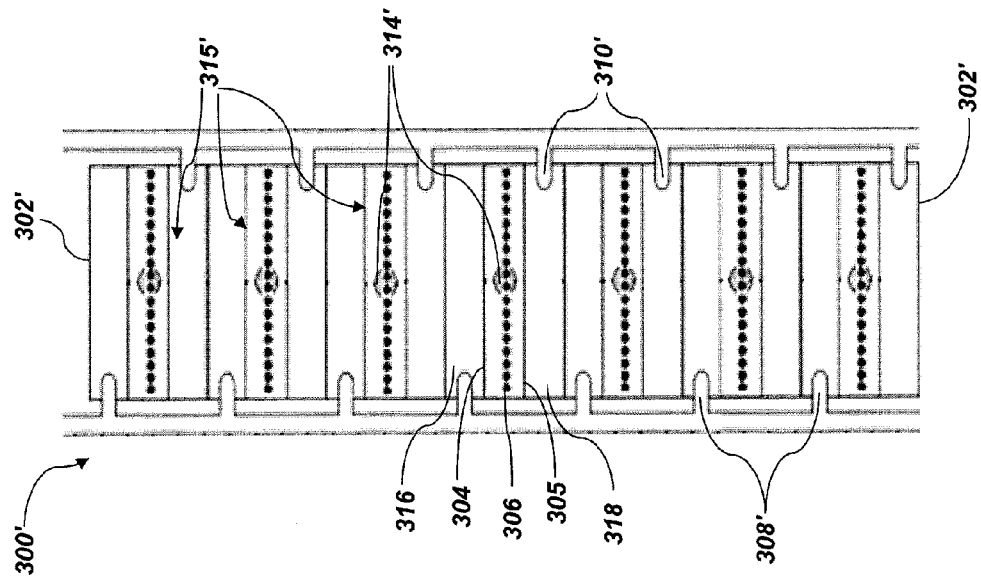
FIGS. 7A and 7B are simplified side-elevation, and cross-sectional views of another reactor for producing solid carbon material, in accordance with yet another embodiment of the disclosure.
Figure 7A:
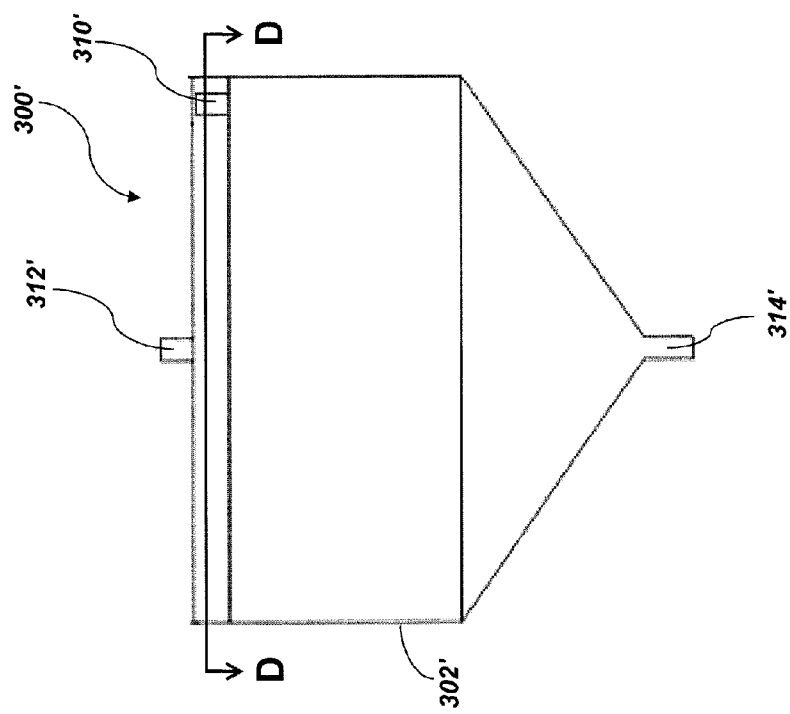

In additional embodiments, the reactor 300 may be configured and operated as depicted in FIGS. 7A and 7B, which respectively illustrate side-elevation and cross-sectional views of a reactor 300' including a plurality of reaction chambers 315' (FIG. 7B). FIG. 7B illustrates a cross-sectional view of the reactor 300' taken about line D-D in FIG. 7A. Referring first to FIG. 7A, the reactor 300' includes an outer shell 302'. The outer shell 302' may have any desired shape (e.g., spherical, semi-spherical, cylindrical, semi-cylindrical, tubular, quadrilateral, truncated versions thereof, or an irregular shape) and size. In addition, the outer shell 302' may include a plurality of reaction gas inlets 308', a plurality of reaction product outlets 310', a plurality of catalyst material inlets 312', and a plurality of catalyst material outlets 314'. The plurality of reaction gas inlets 308' may be interconnected (see FIG. 7B), and each of the plurality of reaction gas inlets 308' may be substantially similar to the reaction gas inlet 308 described with respect to FIGS. 6A and 6B. Similarly, the plurality of reaction product outlets 310' may interconnect (also see FIG. 7B), and each of plurality of reaction product outlets 310' be substantially similar to the reaction product outlet 310 described with respect to FIGS. 6A and 6B. In addition, the plurality of catalyst material inlets 312' may be interconnected, and each of the plurality of catalyst material inlets 312' may be substantially similar to the catalyst material inlet 312 described with respect to FIGS. 6A and 6B. Further, the plurality of catalyst material outlets 314' may be interconnected, and each of the plurality of catalyst material outlets 314' may substantially similar to the catalyst material outlet 314 described with respect to FIGS. 6A and 6B.

Referring next to FIG. 7B, the outer shell 302' may at least partially define the plurality of reaction chambers 315'. The plurality of reaction chambers 315' may include at least two reaction chambers. The plurality of reaction chambers 315' may be operatively associated with the plurality of reaction gas inlets 308', the plurality of reaction product outlets 310', the plurality of catalyst material inlets 312' (FIG. 7A), and the plurality of catalyst material outlets 314'. Each of the plurality of reaction chambers 315' may be substantially similar to the reaction chamber 315 described with respect to FIG. 6B. For example, as illustrated in FIG. 7B, each of the plurality of reaction chambers 315' includes the porous material structure 304, the other porous material structure 305, the layer of catalyst material 306, the reaction chamber region 316, and the other reaction chamber region 318. The porous material structure 304 and the other porous material structure 305 of each of the plurality of reaction chambers 315' may be coupled to or integral with the outer shell 302'. Optionally, each of the plurality of reaction chambers 315' may further include at least one additional structure (not shown) configured to support at least one of the porous material structure 304 and the other porous material structure 305. In some embodiments, at least one of the reaction chamber region 316 and the other reaction chamber region 318 of one or more of the plurality of reaction chambers 315' may include baffling or distribution piping.

Each of the plurality of reaction chambers 315' may be configured and operated to have an operating temperature of greater than or equal to about 450° C., such as greater than or equal to about 650° C., and to have an operating pressure within a range from about 0 psi (i.e., about 0 pascal) to about 900 psi (i.e., about $6.21 \times 10^6$ pascal), such as from about 0 psi (i.e., about 0 pascal) to about 600 psi (i.e., about $4.14 \times 10^6$ pascal). In addition, the reactor 300' may be configured as to enable maintenance and replacement of one or more components of each of the plurality of reaction chambers 315'.

Another embodiment of a reactor of the disclosure will now be described with reference to FIG. 8, which illustrates a simplified cross-sectional view a reactor 400. The reactor 400, which may also be considered a ribbon reactor, includes an outer shell 402. The outer shell 402 may have any desired shape (e.g., spherical, semi-spherical, cylindrical, semi-cylindrical, quadrilateral, tubular, truncated versions thereof, or an irregular shape) and size. The outer shell 402 may include at least one reaction gas inlet 408, at least one reaction product outlet 410, at least one catalyst material inlet 412, and at least one catalyst material outlet 414. The reaction gas inlet 408 may be configured to receive reaction gases, such as the carbon oxide and the gaseous reducing material previously described. The reaction product outlet 410 may be configured to remove at least one of unreacted reaction gases (if any), and reaction products (e.g., the solid carbon material, water, etc.) from the reactor 400. The catalyst material inlet 412 and the catalyst material outlet 414 may be configured to respectively receive and remove at least one catalyst material structure 406, as described in further detail below.

Figure 8:
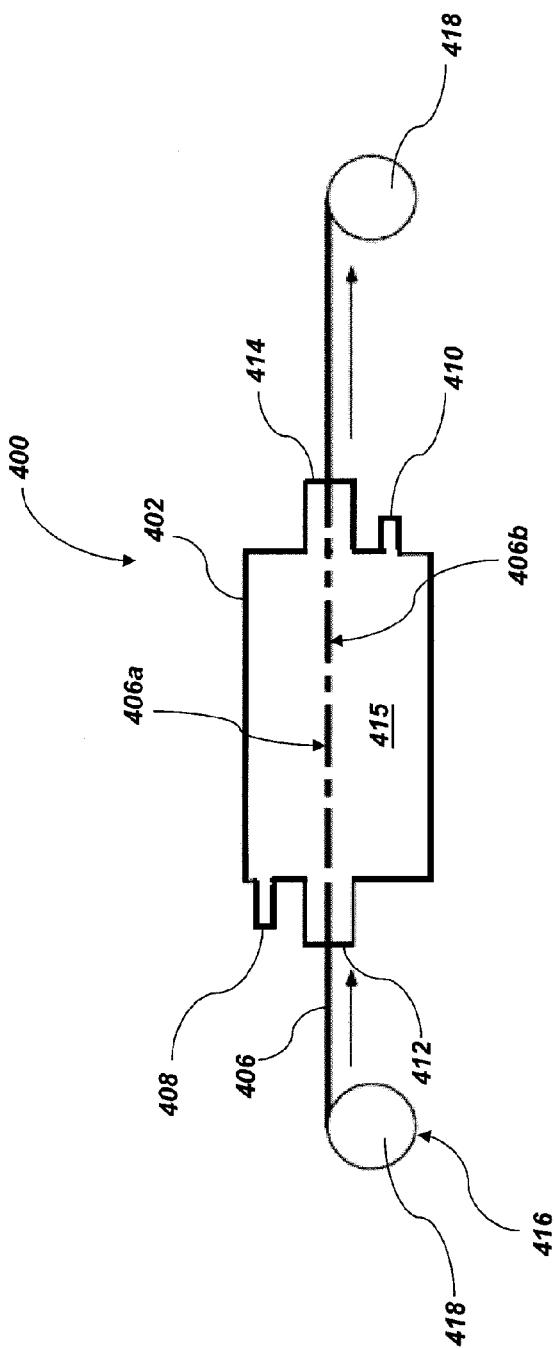
FIG. 8 is a simplified cross-sectional view of another reactor for producing solid carbon material, in accordance with yet another embodiment of the disclosure.

As shown in FIG. 8, the outer shell 402 may at least partially define at least one reaction chamber 415. The reaction chamber 415 is configured and operated to produce a solid carbon material and water through at least one of the reduction reactions of Equations 1, 4, and 5. The reaction chamber 415 may include at least a portion of the catalyst material structure 406 (e.g., the catalyst material structure 406 may at least partially extend through the reaction chamber 415). The catalyst material structure 406 may, for example, be a sheet, foil, mesh, or ribbon of the catalyst material previously described that extends through the catalyst material inlet 412, the reaction chamber 415, and the catalyst material outlet 414. The catalyst material structure 406 may have any desired geometric configuration (e.g., planar, cylindrical, tubular, spiral, etc.) and dimensions as it extends through the reaction chamber 415.

By way of non-limiting example, in some embodiments, the portion of the catalyst material structure 406 extending through the reaction chamber 415 may be a substantially planar sheet of the catalyst material (e.g., a substantially planar sheet of steel foil) having a thickness of less than about 19.05 millimeters (mm), such as from about 19.05 mm to about 0.254 mm. The reaction chamber 415 may be configured such that reaction gases (e.g., the carbon oxide and the gaseous reducing material described) within the reaction chamber 415 contact at least one surface of the catalyst material structure 406 within the reaction chamber 415. For example, the reaction chamber 415 may include one or more structures (not shown) enabling the reaction gases to flow in a tortuous path across a first surface 406a of the catalyst material structure 406 and an opposite, second surface 406b of the catalyst material structure 406. The reaction chamber 415 may be configured and operated to have an operating temperature of greater than or equal to about 450° C., such as greater than or equal to about 650° C., and to have an operating pressure within a range from about 0 psi (i.e., about 0 pascal) to about 900 psi (i.e., about $6.21 \times 10^6$ pascal), such as from about 0 psi (i.e., about 0 pascal) to about 600 psi (i.e., about $4.14 \times 10^6$ pascal).

The reactor 400 may further include at least one conveying mechanism 416 configured and operated to continuously transport or convey the catalyst material structure 406 through the reaction chamber 415. As shown in FIG. 8, the conveying mechanism 416 may, for example, include a plurality of rollers 418 configured to drive and/or draw the catalyst material structure 406 through the reaction chamber 415. For example, at least one of the plurality of rollers 418 may be configured to uncoil and drive a spool of catalyst material (e.g., a spool of sheet metal foil) located thereon, and at least one other of the plurality of rollers 418 may be configured to draw and recoil the catalyst material. In additional embodiments, the conveying mechanism 416 may further include a conveyor belt (not shown) operatively associated with the plurality of rollers 418, and configured to transport the catalyst material structure 406 through the reaction chamber 415 at least one time. The catalyst material structure 406 may, for example, be provided (e.g., placed, mounted, bonded, coated, etc.) on the conveyor belt. The catalyst material structure 406 may, for example, be conveyed through the reaction chamber 415 using a reel-to-reel configuration, or continuous belt configuration.

In operation, reaction gases, such as the carbon oxide and the gaseous reducing material previously described, may be supplied to into the reaction chamber 415 of the reactor 400 by way of the reaction gas inlet 408. Simultaneously or sequentially, the catalyst material structure 406 may be conveyed into the catalyst material inlet 412, through the reaction chamber 415, and out the catalyst material outlet 414. As the catalyst material structure 406 passes through or contacts the reaction gases within the reaction chamber 415, at least a portion of the reaction gases are converted into the solid carbon material and water vapor (e.g., by way of one or more of the reduction reactions of Equations 1, 4, and 5, as previously described).

At least a portion of the solid carbon material may be formed on the catalyst material structure 406, such as on at least one of the first surface 406a of the catalyst material structure 406 and the opposite, second surface 406b of the catalyst material structure 406. The flow rate of the reaction gases into the reaction chamber 415 and the rate at which the catalyst material structure 406 is conveyed through the reaction chamber 415 may be controlled as to facilitate a desired amount of solid carbon material formation on the catalyst material structure 406. In addition, in some embodiments, one or more portions of the catalyst material structure 406 may be masked to isolate the formation of the solid carbon material on the catalyst material structure 406 to a desired location or region.

As or after the catalyst material structure 406 exits the reaction chamber 415, the solid carbon material may be removed (e.g., mechanically, chemically, or a combination thereof) from the catalyst material structure 406. For example, the solid carbon material may be abraded (e.g., scraped, brushed, etc.), agitated (e.g., shaken, vibrated, etc.), rinsed, blown, dissolved, and/or vacuumed from the catalyst material structure 406. Following the removal of the solid carbon material, the catalyst material structure 406 may redirected into the catalyst material inlet 412 of the reactor 400, or may otherwise be utilized as desired. Unreacted reaction gases (if any) and at least some reaction products (e.g., water) may exit the reaction chamber 415 by way of the reaction product outlet 410.

The following examples serve to explain embodiments of the present disclosure in more detail. The examples are not to be construed as being exhaustive or exclusive as to the scope of the disclosure.

EXAMPLES

Example 1

Reaction Rate of Bosch Reaction

A Bosch reaction was conducted in a 5.08 cm diameter carbon steel pipe reactor using a feed stream containing 20 mole % $CO_2$ and 80 mole % $H_2$ to form a solid carbon material. Reaction rate was found to be substantially independent of temperature in the range of 600° C. to 850° C. The reaction was effectively arrested above 900° C. Rough measurements of the rate of carbon deposition on the carbon steel reactor wall were 8 gm/hr on the reactor surface along 15.24 cm of the length of the reactor. This corresponds to a reaction rate of $0.9134 \times 10^{-5}$ g/sec/cm² for these conditions.

Example 2

Thermodynamic Analysis for Bosch Reaction

Figure 9:
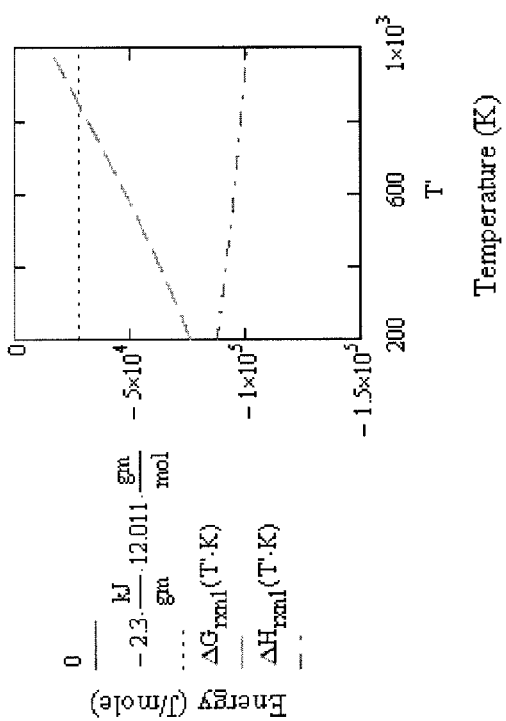
FIGS. 9-34 are graphs depicting analysis performed in the design of the reactors of the disclosure, as described hereinbelow in Examples 1 through 7.
Figure 10:
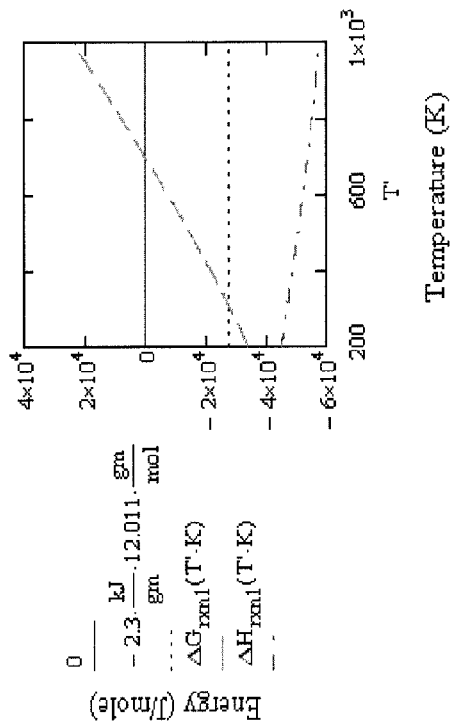
Figure 11:
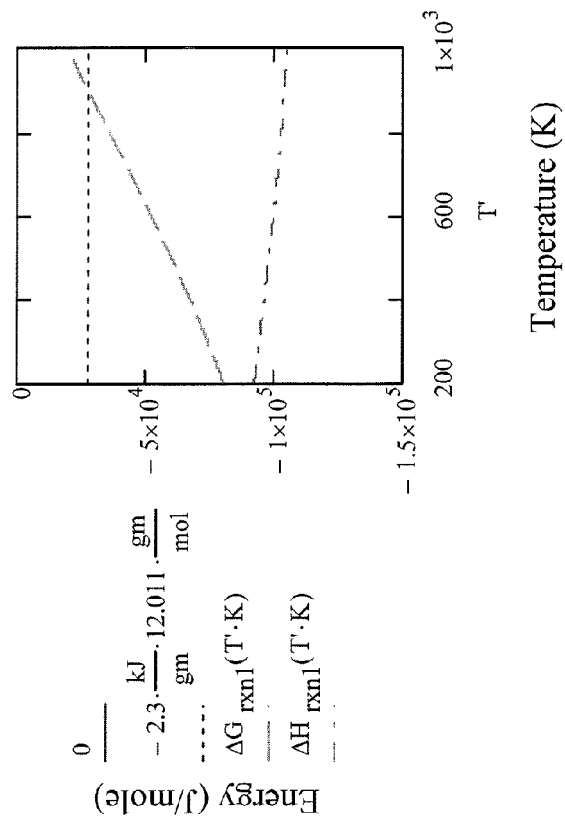

Thermodynamic data for an analysis of the Bosch reaction of Equation 1 was obtained from Burcat, A., and Ruscic, B. "Third Millennium Ideal Gas and Condensed Phase Thermochemical Database for Combustion with Updates from Active Thermochemical Tables," Argonne National Lab 2005 (hereinafter referred to as "Burcat"). Using data from Burcat, heat of reaction ($\Delta H_{rxn}$) and Gibbs free energy ($\Delta G$.) for carbon nanotubes (CNTs) were determined using C60 and graphite and analogues for CNTs. FIG. 9 is a graph depicting $\Delta H_{rxn}$ and $\Delta G_{rxn}$ for the Bosch reaction using graphite as an analogue for CNTs. FIG. 10 is a graph depicting $\Delta H_{rxn}$ and $\Delta G_{rxn}$ for the Bosch reaction using C60 as an analogue for CNTs. FIG. 11 is a graph depicting $\Delta H_{rxn}$ and $\Delta G_{rxn}$ for the Bosch reaction using the heat properties of CNTs. $\Delta G_{rxn}$ is a measure of the spontaneity of the reaction. When the $\Delta G_{rxn}$ is negative, the reaction is spontaneous; when the $\Delta G_{rxn}$ is positive, the reaction is non-spontaneous. When the $\Delta G_{rxn}$ is zero, the reaction is in equilibrium.

If CNTs are considered an analogue to C60, the Bosch reaction may be non-spontaneous at temperatures above about 750K (i.e., about 475° C.). If CNTs are considered an analogue to graphite, the Bosch reaction may be spontaneous for temperatures up to about 1200K (i.e., about 927° C.). Accordingly, without being bound to a particular theory, it is believed that the experimentally observed termination of the reaction above about 900° C. may be due to equilibrium within the Bosch reaction and not due to oxidation of the catalytic surface. Thus, a good CNT analogue, based upon reaction spontaneity, may be either graphite or a combination of graphite properties with alterations for the heat of combustion measurements.

Figure 12:
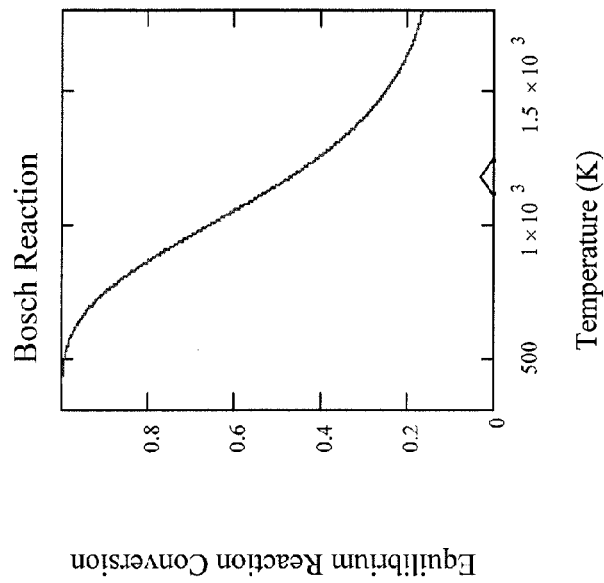

$\Delta G_{rxn}$ was used to establish the equilibrium constant ($K_{eq}$) for the Bosch reaction. The relationship between $\Delta G_{rxn}$ and $K_{eq}$, is:

$$\Delta G_{rxn} = -R_g T \ln(K_{eq}) \qquad (8)$$

where $R_g$ is the gas constant and T is the absolute temperature (K) at which the equilibrium is to be predicted. Using the heat of combustion altered graphite thermodynamic properties for CNTs, the equilibrium reaction conversion was predicted for the Bosch reaction as a function of temperature. FIG. 12 is a graph depicting equilibrium conversions for the Bosch Reaction as a function of temperature. The calculations for the graph of FIG. 12 were performed for reactants with 20 mole % $CO_2$ and 80 mole % $H_2$. The diamond data point on the x-axis indicates the temperature of 900° C., where the reaction was experimentally found to terminate. FIG. 12 illustrates that the equilibrium reaction conversion at low temperatures is 1.0 (i.e., indicating complete reaction) and decreases to near zero as the temperature increases. At 900° C. the equilibrium reaction conversion is about 40%. The reaction equilibrium conversion indicates a decrease in reaction conversion as temperature increases.

In analysis of the Bosch reaction performed in the presence of an iron catalyst, there are several iron oxidation reactions that were considered. Namely, the oxidation reactions for wüstite (FeO), magnetite ($Fe_3O_4$), and hematite ($Fe_2O_3$) were considered, which respectively have the following chemical equations:

$$2Fe_s + O_2 \leftrightarrow 2FeO_s \qquad (9)$$

$$3/2 Fe_s + O_2 \leftrightarrow 1/2 Fe_3O_{4s} \qquad (10)$$

$$1/3 Fe_s + O_2 \leftrightarrow 2/3 Fe_2O_{3s} \qquad (11)$$

$Fe_3O_4$ has the lowest free energy of formation, and is the most stable of FeO, $Fe_3O_4$, and $Fe_2O_3$ at low temperatures. Noting the nature of the iron oxidation reactions above, the partial pressure of oxygen may be used predict the equilibrium at a given temperature.

Figure 13:
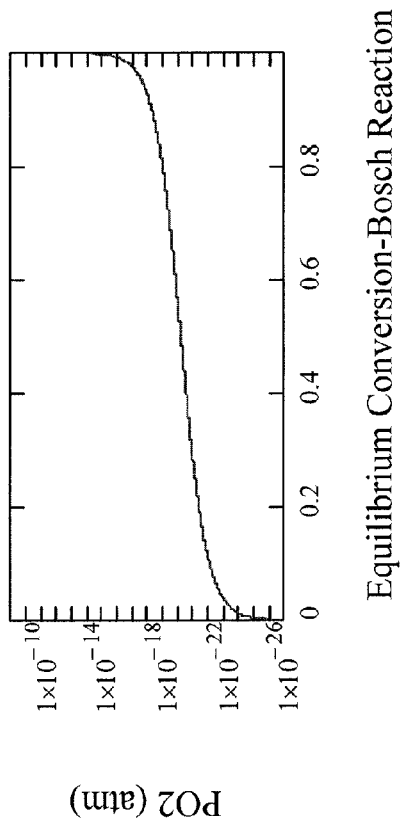

Using the equilibrium conversion for the Bosch reaction, the ratio of hydrogen to water was determined using the data depicted in FIG. 12. Combining the ratio of hydrogen to water with the reaction equilibrium for the water synthesis reaction:

$$2H_2+O_2 \leftarrow\rightarrow 2H_2O(g) \quad (12),$$

the partial pressure of oxygen was determined FIG. 13 is a graph illustrating the partial pressure of oxygen versus conversion of the Bosch reaction.

Upon predicting the partial pressure of oxygen, the spontaneity of the iron oxidation reactions above (i.e., Equations 9, 10, and 11) was predicted as a function of temperature using $\Delta G_{rxn}$ for the oxidation reaction and the partial pressure of oxygen according to the following equation:

$$\Delta G_{rxn} = \Delta G_{Fe\text{-}oxidation\text{-}rxn} - R_g T \ln(P_{O2}/P_{Tot}) \quad (13).$$

Figure 14:
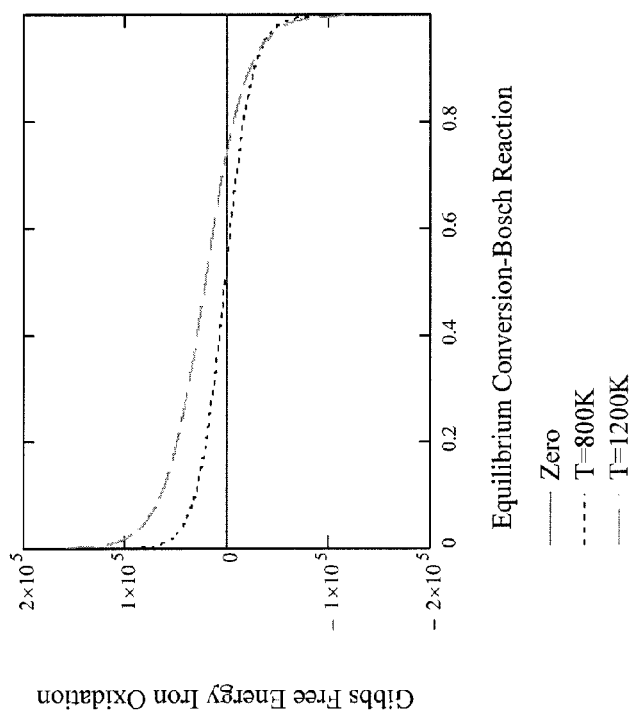

FIG. 14 is a graph showing $\Delta G_{rxn}$ for the oxidation of Fe to $Fe_3O_4$ versus conversion of the Bosch reaction. As oxidation occurs when $\Delta G_{rxn}$ is negative, the Bosch reaction conversion where Fe oxidation takes place can be different for different temperatures. At about 1200K (i.e., about 927° C.), the conversion above which iron oxidation takes place is about 75%. At lower temperatures, the conversion limit is smaller, but more than about 50% for temperatures above about 800K (i.e., about 500° C.).

Figures 15, 16:
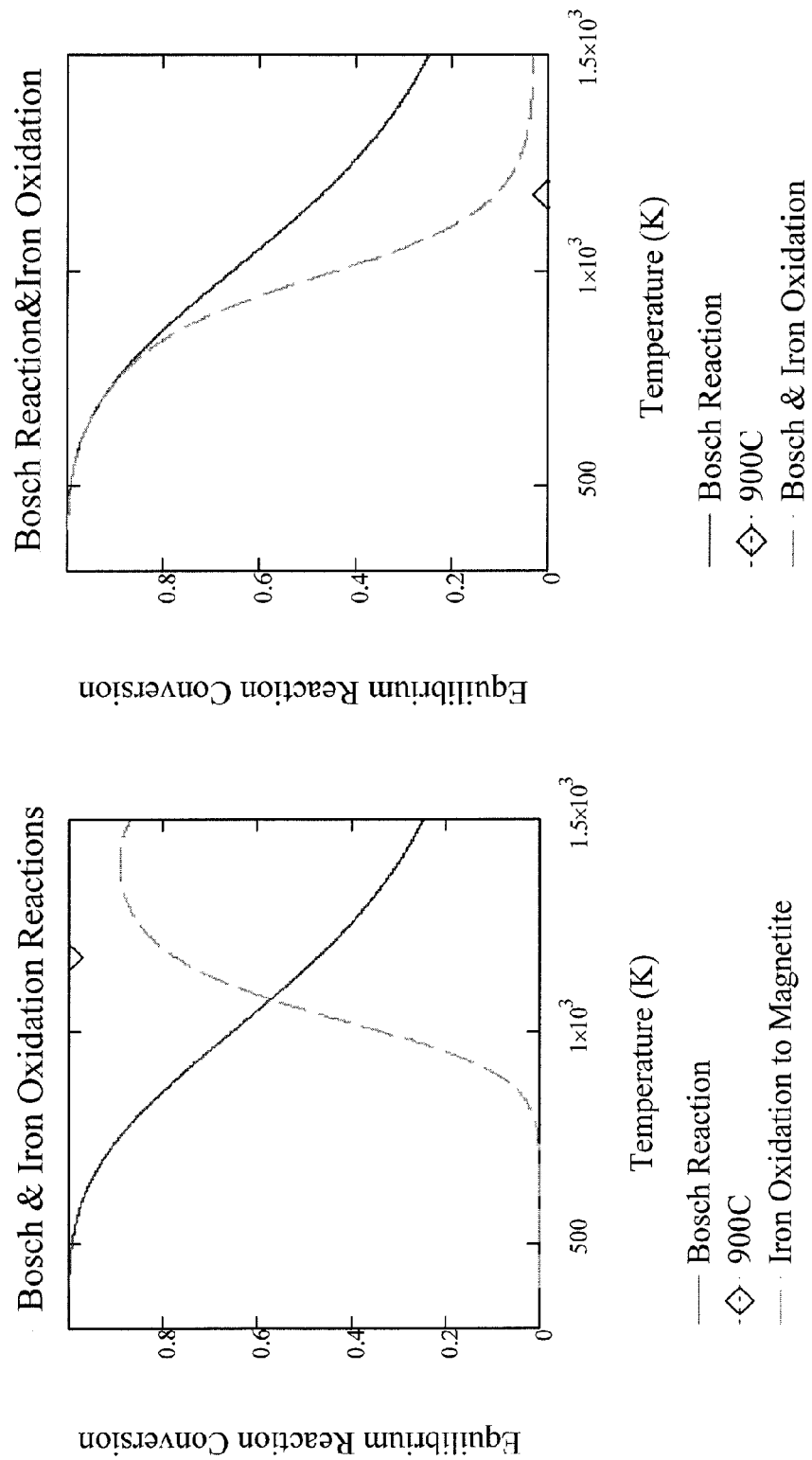

Using $\Delta G_{rxn}$ for the oxidation of Fe to $Fe_3O_4$ and the partial pressure of oxygen obtained from the water synthesis reaction (i.e., Equation 12), where the ratio of hydrogen to water was determined from the equilibrium of the Bosch reaction, the equilibrium conversion of Fe to $Fe_3O_4$ was determined as a function of temperature. FIG. 15 is a graph depicting the equilibrium conversion for the Bosch reaction and the Fe oxidation reaction (to $Fe_3O_4$) as a function of temperature. The data for FIG. 15 was calculated for reactants with 20 mole % $CO_2$ and 80 mole % $H_2$. The diamond data point on the x-axis indicates the temperature of 900° C. where the reaction was experimentally determined to terminate. FIG. 15 shows that the Fe oxidation equilibrium conversion increases as the temperature increases by becoming largely oxidized (i.e., conversion=1.0) for temperatures approaching 900° C. FIG. 16 depicts a combination of the Bosch reaction equilibrium conversion and the Fe oxidation equilibrium conversion as compared to the Bosch reaction conversion alone. The calculation was performed for reactants with 20 mole % $CO_2$ and 80 mole % $H_2$. The diamond data point on the x-axis indicates the temperature of 900° C. where the reaction was experimentally determined to terminate. FIG. 16 facilitates prediction of the Bosch reaction conversion with and without considering the iron oxidation and of the equilibrium conversion for both. In FIG. 16, the equilibrium conversion for the combined reactions is shown in the dashed curve, where there is a conversion decline to essentially zero at about 900° C., which is below the equilibrium conversion of the Bosch reaction alone. The combination equilibrium conversion declines to zero at 900° C., as was observed experimentally.

Example 3

Reaction Kinetics Analysis for Bosch Reaction

Figure 17:
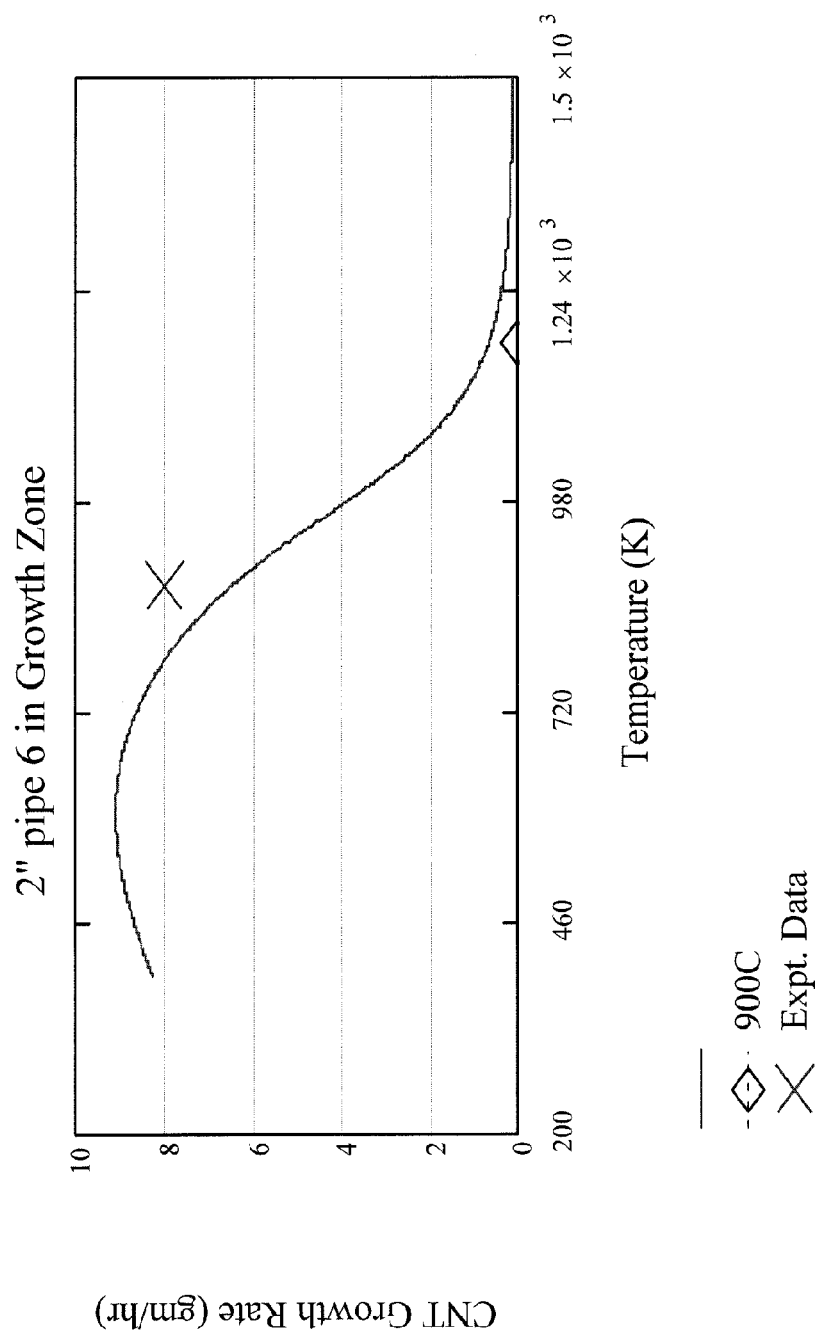

Experimental observations indicated that the Bosch reaction of Equation 1 is a weak function of temperature, suggesting that a surface reaction with an Arrhenius rate constant that doubles the rate with every 10° C. increase in temperature is not applicable. Considering the possible rate determining steps for the synthesis of CNTs, there may only be surface reaction (e.g., at the surface of an Fe nanoparticle attached to a head of a growing nanotube) and boundary layer diffusion as possible mechanisms. The mass transfer flux [moles/area/time] from flow in a pipe to its wall at a given axial position, z, is given by:

$$J = k_c(z) * (C - C_o) \quad (14),$$

where C is the concentration of $CO_2$ in the pipe center and $C_o$ is the concentration of $CO_2$ at the pipe surface. Should the reaction at the surface of the pipe be fast, $C_o$ will trend to the $CO_2$ equilibrium mole fraction at the temperature of the CNT surface. In addition, the position dependent mass transfer coefficient, $k_c(z)$, is given by the equation:

$$k_c(z) = \frac{D_{CO2\_H2O}}{D_{tube}} \cdot \left[ 1.077 \cdot \left(\frac{Pe_M}{\frac{z}{D_{tube}}}\right)^{\frac{1}{3}} + 3.66 + \frac{0.0668 \cdot \frac{Pe_M}{\frac{z}{D_{tube}}}}{1 + 0.04 \cdot \left(\frac{Pe_M}{\frac{z}{D_{tube}}}\right)^{\frac{2}{3}}} \right], \quad (15)$$

where $D_{CO2\_H2O}$ is the $CO_2$ diffusion coefficient, $D_{tube}$ is the tube diameter, $Pe_M = (D_{tube} * V_{gas})/D_{CO2\_H2O}$ is the Peclet number for the flow in the tube with a gas velocity of $V_{gas}$ and z is the axial position where the mass transfer is taking place. FIG. 17 is a graph depicting the experimental carbon nanotube growth rate in a 15.24 cm growth zone of a 5.08 cm diameter pipe as a function of temperature. The reaction of Equation 15 may be analyzed using only $CO_2$ diffusion, and assuming that the $CO_2$ diffusion is slow with respect to the diffusion of hydrogen. Using a mass transfer coefficient of z=0.8 m and a 15.24 cm (6 in) long growth zone, the mass transfer rate to the pipe wall at various reaction temperatures was compared to that measured by experiment (i.e., 8 gm/hr, as indicated in FIG. 17). As temperature increases, the equilibrium of the Bosch reaction appears to limit the reaction and near 900° C. the oxidation of Fe also appears to limit the reaction, forcing the CNT growth rate to fall to about zero.

To accommodate dense forest, pillows, or other entangled morphologies of CNTs at the surface of the pipe, and noting that each CNT generally has an Fe nanoparticle on its tip, the surface area for mass transfer was scaled down from that of the pipe to that of the packing fraction of the CNTs (that is, cubic close packed spheres in a single plane) at the CNT growth surface. For a cubic close packing of circles the packing fraction is $\pi/4=0.785$ multiplied by the growth rate depicted in FIG. 17 to simulate forest growth. The maximum growth rate predicted was about 7 gm/hr.

Figure 18:
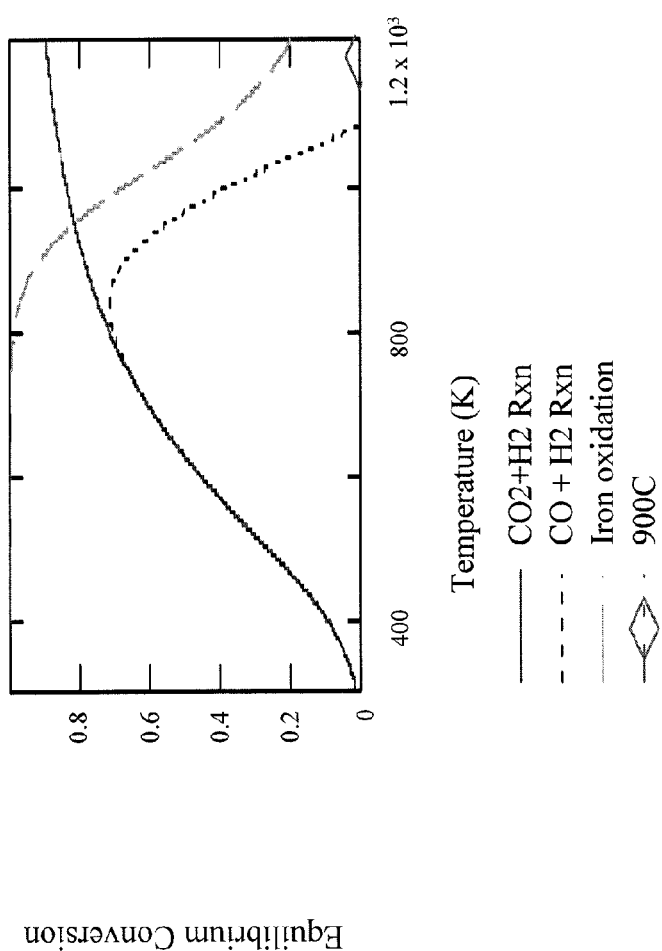

The analysis depicted in FIGS. 16 and 17 was also performed for the two-step reaction mechanism where the $CO_2$ first produces CO by a reaction in equilibrium and then the CO further reacts to form CNTs as discussed (i.e., Equations 2 and 3). FIG. 18 is a graph depicting the combination of the Bosch reaction broken into this two-step reaction mechanism and iron oxidation equilibrium conversions. The calculations for FIG. 18 were performed for reactants with 20 mole % $CO_2$ and 80 mole % $H_2$. The diamond data point on the x-axis indicates the temperature of 900° C., where the reaction was experimentally observed to terminate. As indicated in FIG. 18, the CO reaction conversion drops to zero at about 1050K (i.e., about 775° C.), well below the 900° C. point observed in experiments. Using the two-step reaction mechanism, Fe is apparently not oxidized within the reaction conversions predicted by the equilibria of the first and second reactions of the two-step reaction mechanism. Without being bound to a particular theory, these differences may be due to an erroneous value of the heat of formation for the carbon nanotubes used in this analysis, or this may not be the correct reaction mechanism.

Figure 19:
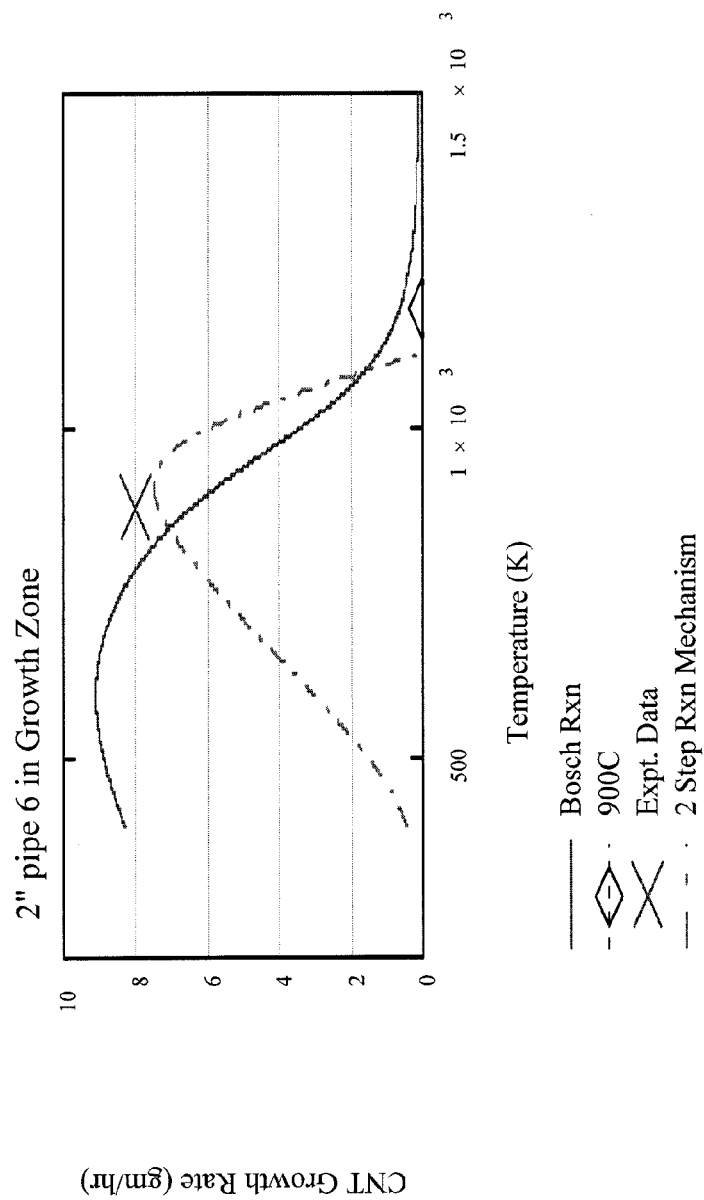

FIG. 19 is a graph depicting the CNT growth rate on the 15.24 cm growth zone of a 5.08 cm diameter pipe as a function of temperature. The reaction rate results of the two-step reaction mechanism gave a more temperature sensitive curve than the Bosch reaction, which is also plotted in FIG. 19 for comparison. Both growth rates fall off before 900° C. The two-step reaction mechanism has a low rate at about 500K (i.e., about 773° C.), which increases to a 7.5 gm/hr peak at about 950K (i.e., about 675° C.). Without being bound to a particular theory, it is believed that the reason these two mechanisms predict reasonably similar reaction rates is because there are compensating effects with the two-step reaction rate (e.g., the diffusion of CO is faster than the diffusion of $CO_2$ in the Bosch reaction alone but the mole fraction of the material diffusing in the two-step reaction mechanism, CO, is less than that diffusing in the Bosch reaction, $CO_2$). In both cases, the simultaneous diffusion of hydrogen is much faster due to its much higher diffusion coefficient.

Example 4

Reactor Design using the Bosch Reaction

Using the results of both the Bosch reaction thermodynamics analysis and the conversion equilibria analysis of Examples 2 and 3, the design of reactors for the reactions was analyzed. The analysis assumed that the heat of formation for CNTs is equivalent to the heat of formation of graphite. Further experimental data may render that assumption misplaced in some way, but it is currently believed the assumption is valid for design of a reactor facilitating the Bosch reaction. Reaction heat effects were observed by adding an energy balance to the graph of FIG. 16. The energy balance equation indicates an increase in temperature as reaction conversion increases.

Figures 20, 21:
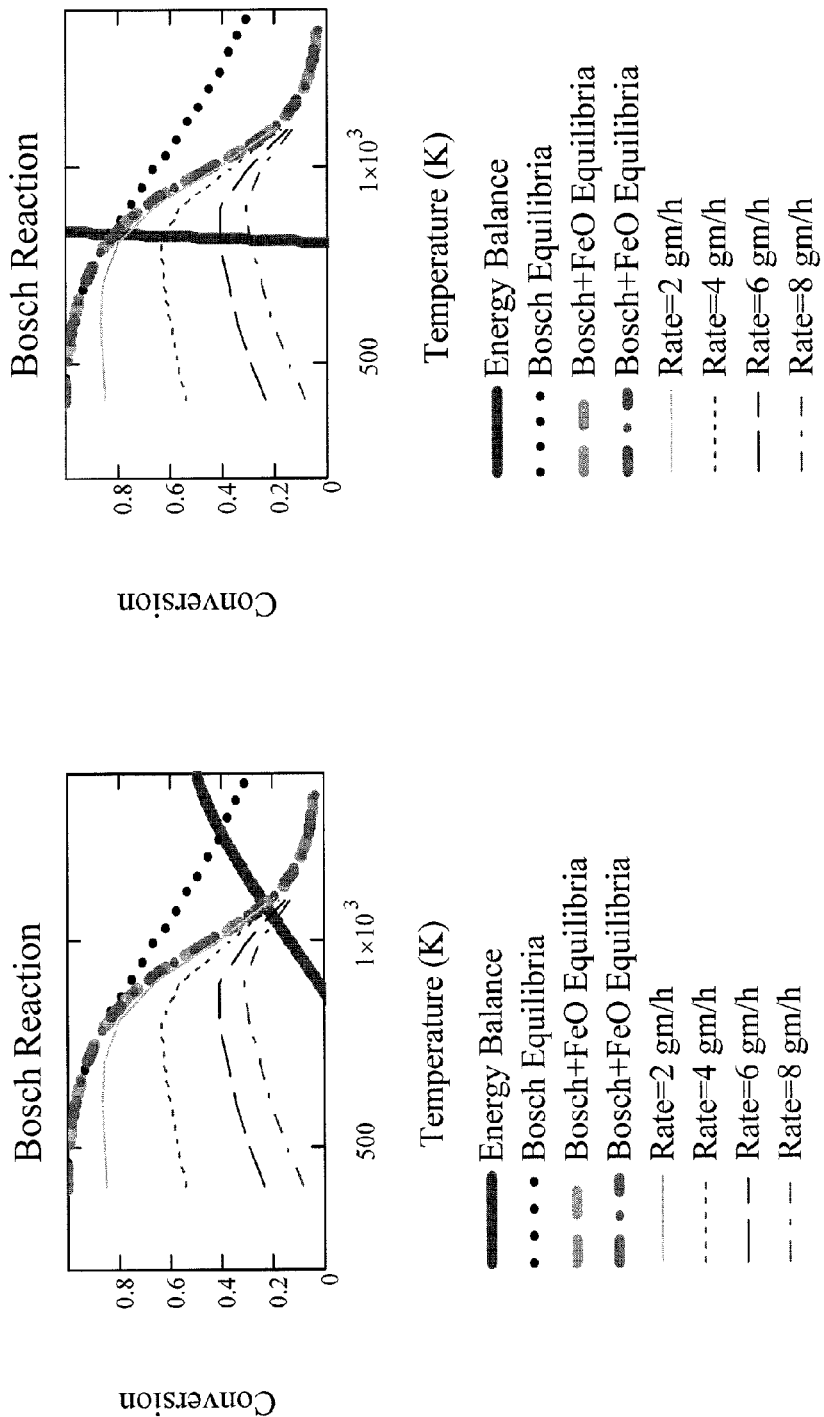

FIG. 20 is a graph depicting the addition of the energy balance equation to the equilibrium conversion graph depicted in FIG. 16. FIG. 21 is a graph depicting the addition of the reaction rates to the equilibrium conversion graph depicted in FIG. 16. FIG. 20 indicates that temperature increases as the reaction conversion increases up to the point where the energy balance limits the conversion to a small value.

In FIG. 21 the reactor is cooled giving a nearly isothermal reaction. As the reaction conversion increases, there is little heating and the point where the energy balance intersects line with the iron oxidation line is at a significantly higher reaction conversion. The size of the reactor may be determined by integrating the reaction rates that are passed when the energy balance line is followed. At zero conversion, the reaction rate is very large. The reaction rate decreases as the iron oxidation line or the Bosch reaction equilibrium line is approached from below.

Reactor design may consider three things simultaneously: the mass balance for the reactor, the energy balance for the reactor, and the pressure drop for the reactor, which are given in terms of the equations below, respectively:

$$\frac{d}{dw}X(T, P) = \frac{-rA}{FAo} \quad (16)$$

$$\frac{d}{dw}T = \frac{(-rA) \cdot (-\Delta HRxn(T)) + U \cdot A_{HT} \cdot (T_{HT} - T)}{FAo \cdot (\Sigma \Theta i Cpi + X \cdot \Delta Cp)} \quad (17)$$

$$\frac{d}{dw}P = \left[\frac{-\beta o}{Ac \cdot pc \cdot (1-\phi)} \cdot \frac{Po}{P} \cdot \frac{T}{To} \cdot (1 + \varepsilon \cdot X)\right] \quad (18)$$

where X is the reaction conversion, w is the weight of catalyst, $r_A$ is the reaction rate of $CO_2$, the limiting reactant, $F_{Ao}$ is the molar flow rate of $CO_2$ into the reactor, T is the temperature and P is the pressure, $\Delta H_{Rxn}$ is the heat of reaction, U is the overall heat transfer coefficient should there be cooling (or heating) inside the reactor, $A_{HT}$ is the heat transfer area, $T_{HT}$ is the temperature of the fluid entering the cooling system, $\theta_i$ is the ratio of the different feed materials to that of $CO_2$, $C_{pi}$ is the heat capacity of feed components, $\Delta C_p$ is the sum of the product of heat capacities and the stoichiometric coefficients for the Bosch reaction with products with a positive for products and negative for reactants. Equations 16, 17, and 18 were solved using the finite difference method. Equations 16, 17, and 18 could also be solved using the Runge-Kutta method.

Figure 23:
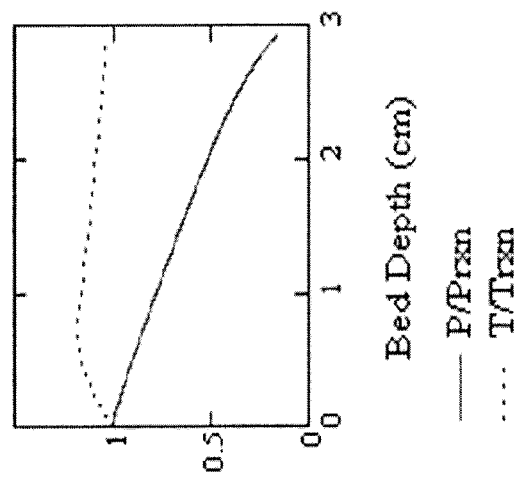
Figure 22:
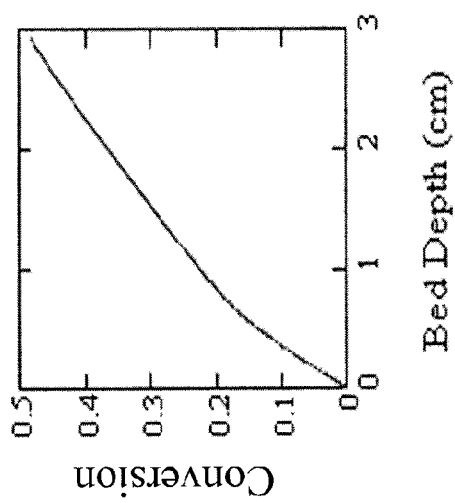

FIG. 22 is a graph depicting reactor conversion as a function of depth for a catalyst having a thickness of 400 μm in a packed bed reactor with reactor feed conditions of $T_o$=873K and $P_o$=850 Torr. FIG. 23 is a graph depicting pressure ratio and temperature ratio as a function of depth for a catalyst having a thickness of 400 μm in a packed bed reactor with reactor feed conditions of $T_o$=873K and $P_o$=850 Torr. The reaction crosses the iron oxidation point at 1 cm catalyst depth.

Adding the effect of cooling (e.g., so that the reaction products leave the reactor at nearly the same temperature as they enter), the reactor conversion is not limited by the oxidation of iron and a greater amount of the catalyst bed can be utilized for the Bosch reaction, arriving at a reaction conversion of 0.5 in a single pass. Due to larger reaction conversion, pressure drop is expended over 3 cm of catalyst bed with cooling. While the reaction size results are for the Bosch reaction, the general trends will also be followed for the two-step reaction of Equations 2 and 3 because it is limited to low conversions at higher temperatures by Equation 3, which is an exothermic reaction (heating up as the reaction proceeds) intersecting with the equilibrium conversion line that is decreasing with increased temperature. Adding cooling to the reaction is beneficial because increasing the outlet conversion of the reactor above that of the adiabatic reactor enables single pass conversion to be increased over that of the adiabatic reactor.

Example 5

Thermodynamic Analysis for the Methane Reduction Reaction

Thermodynamic data for an analysis of the methane reduction reaction of Equation 5 was obtained from Burcat. Using data from Burcat, $\Delta H_{rxn}$ and $\Delta G_{rxn}$ for CNTs were determined using C60 and a graphite analogue for CNTs. Other analogues that could be used include C60, C70 and lamp black.

Figure 24:
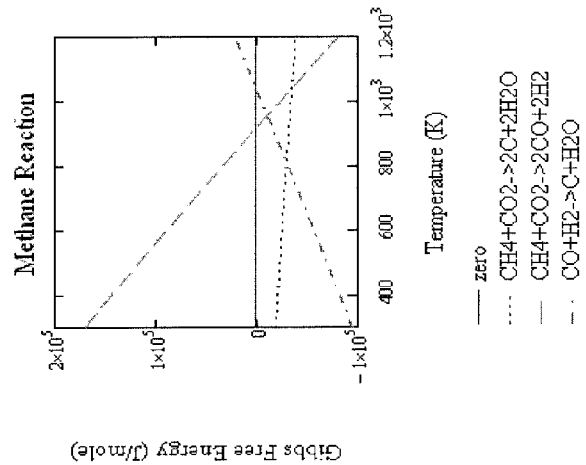
Figure 25:
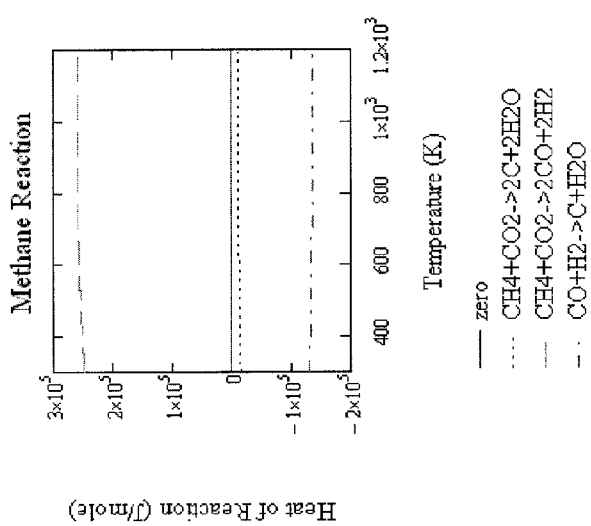
Figures 26, 27:
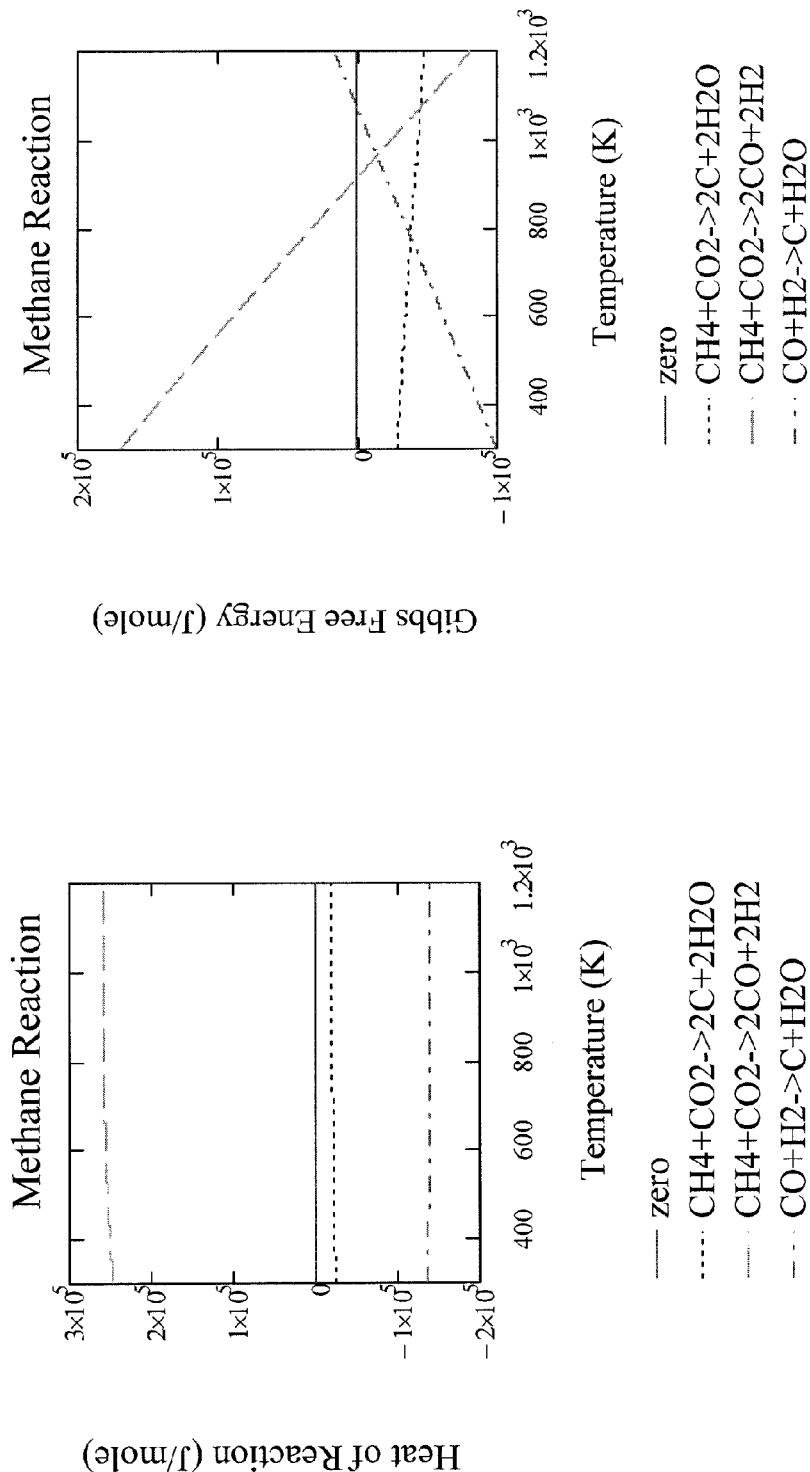

FIG. 24 is a graph depicting $\Delta H_{rxn}$ for the methane reduction reaction using graphite as the analogue for CNTs. FIG. 25 is a graph depicting $\Delta G_{rxn}$ for the methane reduction reaction using graphite as the analogue for CNTs. FIG. 26 is a graph depicting for the methane reduction reaction for the using the heat properties of CNTs. FIG. 27 is a graph depicting $\Delta G_{rxn}$ for the methane reduction reaction for the using the heat properties of CNTs.

In previous work with the hydrogen reaction to produce CNTs, graphite was chosen as the analogue of CNT materials. To improve analysis, heat of combustion measurements were made for CNTs. The data was converted to heat of formation data.

The heat of formation data and heat capacity data for graphite were converted to seven coefficients corresponding to an additional entry for the thermodynamic tables of Burcat for CNTS. Even with the seven coefficients, not all thermodynamic properties can be estimated for multi-walled CNTs. Using data from Burcat and the new entry to the data, the methane reduction reaction had the $\Delta H_{rxn}$ and $\Delta G_{rxn}$ results shown in FIGS. 26 and 27, respectively.

$\Delta G_{rxn}$ is a measure of the spontaneity of the reaction. When $\Delta G_{rxn}$ is negative the reaction is spontaneous, when $\Delta G_{rxn}$ is positive the reaction is non-spontaneous. When $\Delta G_{rxn}$ is zero, the reaction is in equilibrium. The methane reduction reaction of Equation 5 was determined to be spontaneous at all temperatures. As a result, the overall methane reduction reaction of Equation 5 may not be reasonable given the experimental observations.

The two-step reaction of Equations 6 and 7 shows that Equation 6 is spontaneous above about 914K (i.e., about 641° C.) and Equation 7 is spontaneous below about 1038K (i.e., about 765° C.) resulting in a temperature window wherein the two reactions are simultaneously spontaneous. The temperature window for the two-step reaction mechanism of Equations 6 and 7 was in line with experimental observations. Comparing the CNT results of FIGS. 26 and 27 with the graphite results of FIGS. 24 and 25 shows that the temperature window is increased to be within a range of from about 914K to about 1072K (i.e., about 641° C. to about 800° C.) when CNT thermodynamic properties are used for the carbon produced in the reaction. The larger window is in line with experimental observations, as will discussed below. In addition, if the temperature at the centerline of the steel pipe wall is above about 1038K (i.e., about 765° C.) for graphite or about 1072K (i.e., 800° C.) for CNTs, there may be no deposition at the centerline, but at the temperatures that are lower at either side of the centerline, there will be CNT deposition.

Figure 28:
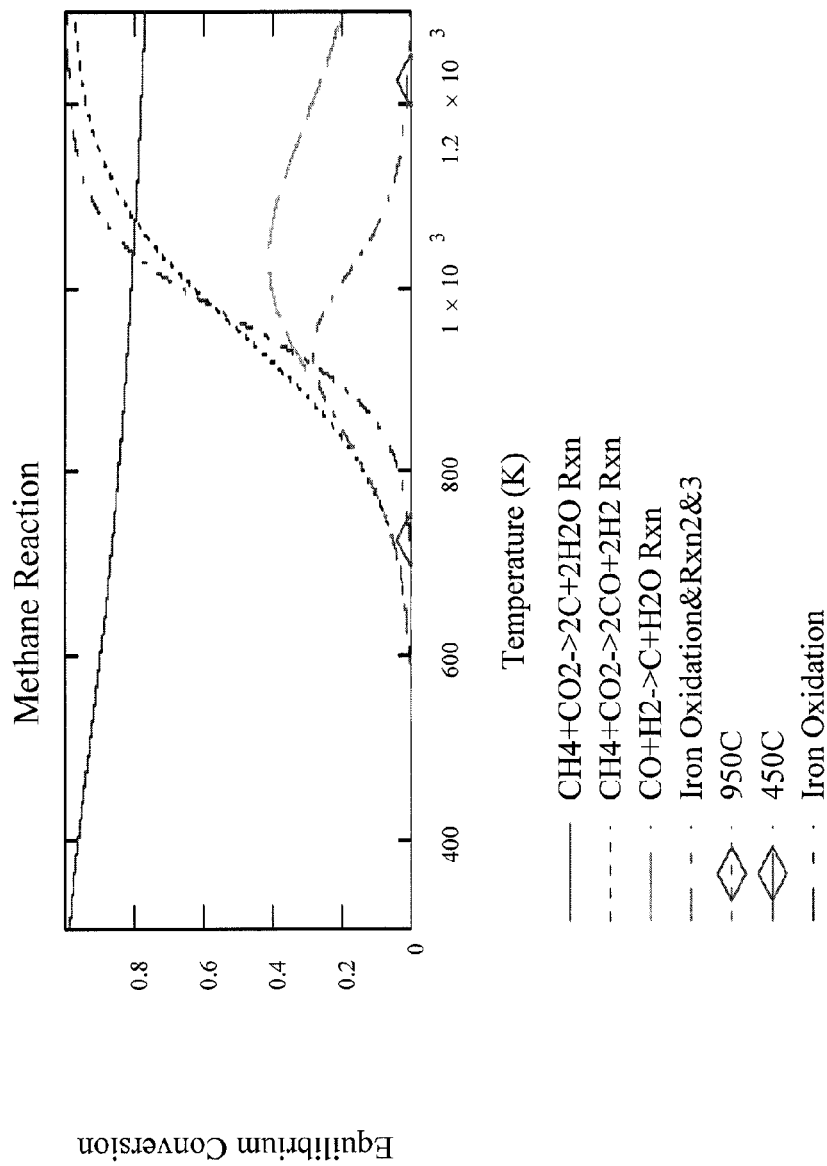

$\Delta G_{rxn}$ was used to establish the equilibrium constant ($K_{eq}$) for the Bosch reaction. Using the heat of combustion altered graphite thermodynamic properties for CNTs, the equilibrium reaction conversion was predicted for the Bosch reaction as a function of temperature. FIG. 28 is a graph depicting equilibrium conversions for the methane reduction as a function of temperature. The calculations for FIG. 28 were performed for reactants with 50 mole % $CO_2$ and 50 mole % $CH_4$. The diamond data points on the x-axis indicate the temperatures where the methane reduction reaction of Equation 5 terminates according to experimental data.

In FIG. 28, using CNT thermodynamic properties, the equilibrium reaction conversion was predicted for the methane reduction reaction as a function of temperature. The conversion was high for all temperatures considered. As the experimental results show a decrease to zero deposition at about 450° C. and below, and at about 950° C. and above, the reaction mechanism of Equation 5 was not believed to be operating in the experiments performed.

In the reaction of Equation 6 (i.e., the first step of the two-step methane reduction reaction mechanism), the equilibrium conversion increases from about 600K (i.e., about 327° C.) up to a value of 1.0 at about 1300K (i.e., about 1027° C.). The onset of reaction is similar to that of the experimental observations, but the high temperature fall off at high temperatures is not predicted by the reaction of Equation 6. In the reaction of Equation 7 (i.e., the second step of the two-step methane reduction reaction mechanism), the equilibrium conversion increases up to a value of 1.0 at about 1300K (i.e., about 1027° C.). The temperature of about 1027° C. is above the experimental observations of about 950° C. By adding in the oxidation of the iron catalyst, as discussed in more detail below, to the reaction of Equation 7, the reaction terminates at about 1200K (i.e., 927° C.), in line with experimental observations. Thus, the two-step reaction mechanism of Equations 6 and 7, when altered by the oxidation of iron, reproduces the onset and offset of the methane reaction in line with experimental observations.

In analysis of the methane reduction reaction using iron catalyst, there are several iron oxidation reactions to be considered, wüstite (FeO), magnetite ($Fe_3O_4$), and hematite ($Fe_2O_3$) with the following oxidation reactions, which respectively have the following oxidation reactions of Equations 9, 10, and 11 presented in relation to Example 2. As previously discussed, $Fe_3O_4$ has the lowest free energy of formation, and is the most stable of FeO, $Fe_3O_4$, and $Fe_2O_3$ at low temperatures. Noting the nature of the iron oxidation reactions above, the partial pressure of oxygen may be used to predict the equilibrium of a given temperature.

Figure 29:
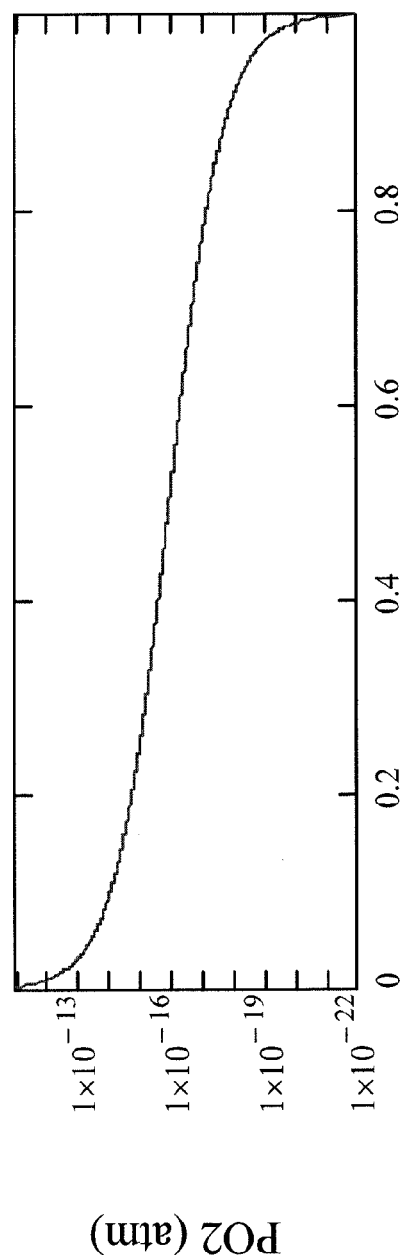
Figure 30:
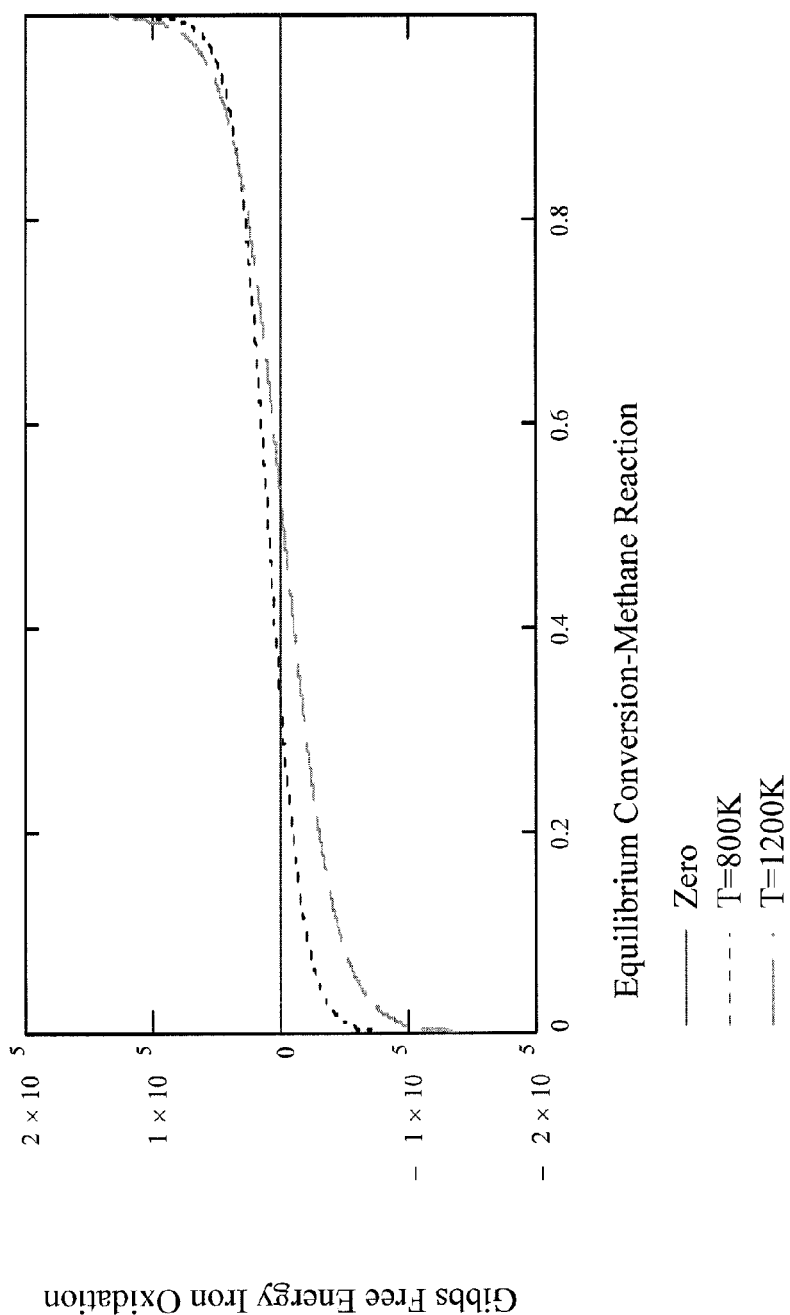

Using the equilibrium conversion for the reaction of Equation 6, the ratio of carbon dioxide to carbon monoxide was determined using the data depicted in FIG. 28. Combining the ratio of carbon dioxide to carbon monoxide with the reaction equilibrium for the reaction:

$$2CO + O_2 \leftrightarrow 2CO_2 \qquad (19),$$

the partial pressure of oxygen was determined Upon determining the partial pressure of oxygen, the spontaneity of the iron oxidation reactions above (i.e., Equations 9, 10, and 11) was predicted as a function of temperature using the $\Delta G_{rxn}$ for the oxidation reaction and the partial pressure of oxygen according to Equation 13. FIG. 29 is a graph illustrating the partial pressure of oxygen versus equilibrium conversion for the first step of the two-step method reduction reaction mechanism (i.e., Equation 6). As oxidation will occur when $\Delta G_{rxn}$ is negative, the methane reduction reaction conversion where Fe oxidation takes place can be different for different temperatures. At about 1200K (i.e., about 927° C.), the conversion above which iron oxidation takes place is about 60%. At lower temperatures, the conversion limit is smaller. FIG. 30 is a graph showing $\Delta G_{rxn}$ for the oxidation of Fe to $Fe_3O_4$ versus equilibrium conversion for the first step of the two-step method reduction reaction mechanism (i.e., Equation 6).

Using $\Delta G_{rxn}$ for the oxidation of Fe to $Fe_3O_4$ and the partial pressure of oxygen obtained from the $CO_2$ synthesis reaction (i.e., Equation 19), where the ratio of $CO_2$ to CO was determined from the equilibrium of the reaction of Equation 6, the equilibrium conversion of Fe to $Fe_3O_4$ was determined as a function of temperature, as shown in FIG. 28. In FIG. 28, the Fe oxidation equilibrium conversion increases as the temperature increases becoming largely oxidized (i.e., conversion=1.0) for temperatures approaching about 1200K (i.e., about 927° C.). Combining the iron oxidation equilibrium conversion and the two-step methane reaction equilibrium conversion, the methane reduction reaction conversion may be predicted with and without considering the iron oxidation, and the equilibrium conversion for the combined reactions may be predicted, as shown in FIG. 28. As depicted in FIG. 28, the equilibrium conversion for the combined reactions declines to essentially zero at about 927° C., which is below the equilibrium conversion of the methane reaction alone. The equilibrium conversion results were in line with experimental observations, suggesting that the oxidation of the iron catalyst is responsible for the decline in CNT production at temperatures of greater than about 927° C.

Example 6

Reaction Kinetics Analysis for the Methane Reduction of $CO_2$

Experimental observations indicated that the methane reduction reaction is a weak function of temperature, suggesting that a surface reaction with an Arrhenius rate constant that doubles the rate with every 10° C. increase in temperature is not applicable. Considering the possible rate determining steps for the synthesis of CNTs, surface reaction (e.g., at the surface of an Fe nanoparticle attached to a head of a growing nanotube) and boundary layer diffusion may be possible mechanisms. The mass transfer flux [moles/area/time] from flow in a pipe to its wall at a given axial position, z, is given by Equation 14, where C is the concentration of CO in the pipe center and $C_o$ is the concentration of CO at the pipe surface. Should the reaction at the surface of the pipe be fast, $C_o$ will trend to the CO equilibrium mole fraction at the temperature of the CNT surface. In addition, the position dependent mass transfer coefficient, $k_c(z)$, is given by the Equation 15, where $D_{CO2\_H2O}$ is the CO diffusion coefficient, $D_{tube}$ is the tube diameter, $Pe_M = (D_{tube}*V_{gas})/D_{CO2\_H2O}$ is the Peclet number for the flow in the tube with a gas velocity of $V_{gas}$ and z is the axial position where the mass transfer is taking place.

Figure 31:
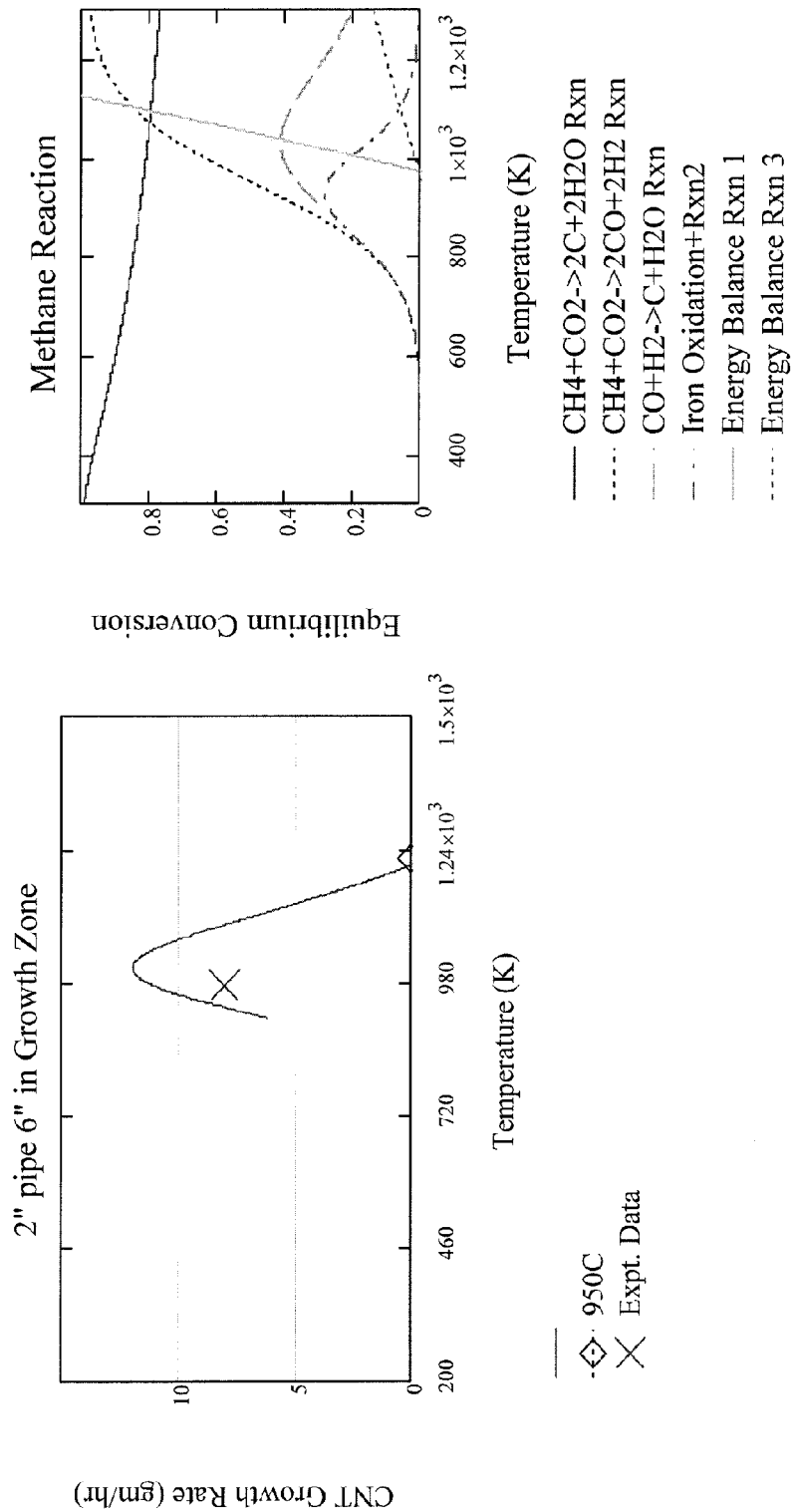

FIG. 31 is a graph depicting the experimental carbon nanotube growth rate in a 15.24 cm growth zone of a 5.08 cm diameter pipe as a function of temperature. The reaction of Equation 15 may be analyzed using only $CO_2$ diffusion, and assuming that the $CO_2$ diffusion is slow with respect to the diffusion of hydrogen. Using a mass transfer coefficient of z=0.8 m and a 15.24 cm (6 in) long growth zone, the mass transfer rate to the pipe wall at various reaction temperatures was compared to that measured by experiment (i.e., 8 gm/hr, as indicated in FIG. 31). As temperature increases, the equilibrium of the methane reduction reaction appears to limit the reaction and near 927° C. the oxidation of Fe also appears to limit the reaction, forcing the CNT growth rate to fall to about zero.

To accommodate dense forest, pillows, or other entangled morphologies of CNTs at the surface of the pipe, and noting that each CNT generally has an Fe nanoparticle on its tip, the surface area for mass transfer was scaled down from that of the pipe to that of the packing fraction of the CNTs (that is, cubic close packed spheres in a single plane) at the CNT growth surface. For a cubic close packing of circles the packing fraction is $\pi/4=0.785$ multiplied by the growth rate depicted in FIG. 31 to simulate forest growth. The maximum growth rate predicted was about 11 gm/hr, close to what was experimentally observed. The reaction mechanism used for the analysis depicted in FIG. 31 was the two-step reaction mechanism where the $CO_2$ and $CH_4$ first produces CO and $H_2$ by a reaction in equilibrium, and then the CO further reacts to form CNTs as discussed above (i.e., Equations 6 and 7). The first reaction may be considered a gas phase reaction that is in equilibrium, and the second reaction may be considered to take place on the catalyst surface, with CO mass transfer to the catalyst surface being the rate determining step.

Example 7

Reactor Design using the Methane Reduction of $CO_2$

Using the results of both the Bosch reaction thermodynamics analysis and the conversion equilibria analysis of Examples 4 and 5, the design of reactors for the methane reduction of $CO_2$ was analyzed. The analysis assumed that the heat of formation for CNTs is equivalent to the heat of formation of graphite. Further experimental data may render that assumption misplaced in some way, but it is currently believed the assumption is valid for design of a reactor facilitating the methane reduction of $CO_2$. Reaction heat effects were observed by adding an energy balance to the graph of FIG. 28. The energy balance equation indicates an increase in temperature as reaction conversion increases.

Figure 32:
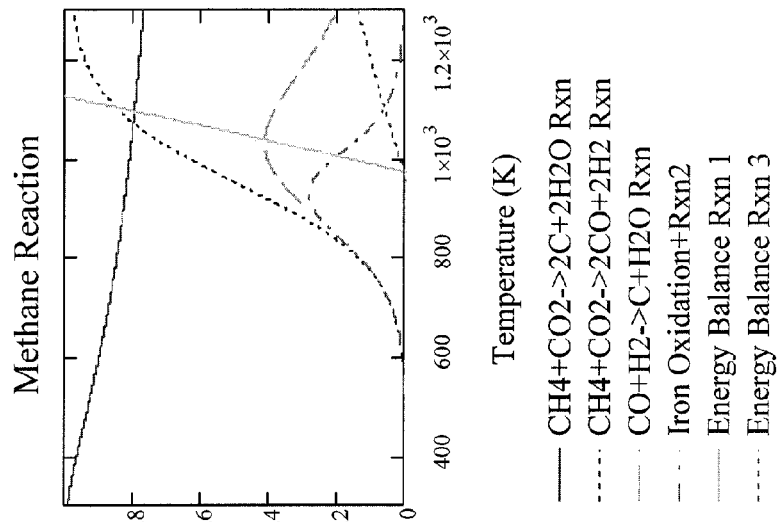

FIG. 32 is a graph depicting the addition of the energy balance equation to the equilibrium conversion graph depicted in FIG. 28. The slope of the energy balance line is given by the ratio of the heat capacity heat of the reactants to the heat of reaction. As both the reaction of Equation 5, and the second step (i.e., Equation 7) of the two-step reaction mechanism are exothermic, temperature increases as the methane reduction reaction proceeds. The addition of cooling to the reactor will decrease the heating that takes place during reaction, enabling a higher reaction conversion to be reached.

The size of the reactor may be determined by integrating the reaction rates that are passed when the energy balance line is followed. At zero conversion, the reaction rate is very large. The reaction rate decreases as the iron oxidation line or the Bosch reaction equilibrium line is approached from below.

As previously discussed with respect to Example 4, reactor design may simultaneously consider the mass balance for the reactor, the energy balance for the reactor, and the pressure drop for the reactor, which are given in terms of the Equations 16, 17, and 18, respectively. Equations 16, 17, and 18 were solved using the finite difference method. Equations 16, 17, and 18 could also be solved using the Runge-Kutta method.

Figure 33:
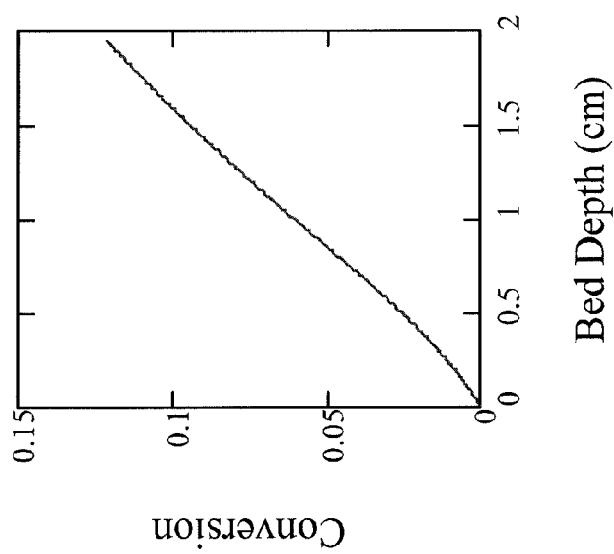

FIG. 33 is a graph depicting reactor conversion as a function of depth for a catalyst having a thickness of 400 µm and diluted to 1 percent active ingredients in a packed bed reactor with reactor feed conditions of $T_o=973K$ (i.e., 700° C.) and $P_o=850$ Torr (i.e., 1.12 atm), and a feed composition of 50/50 mole percent in methane and carbon dioxide. FIG. 23 is a graph depicting pressure ratio and temperature ratio as a function of depth for a catalyst having a thickness of 400 µm and diluted to 1 percent active ingredients in a packed bed reactor with reactor feed conditions of $T_o=973K$ (i.e., 700° C.) and $P_o=850$ Torr (i.e., 1.12 atm), and a feed composition of 50/50 mole percent in methane and carbon dioxide. The reaction crosses the iron oxidation point at 2 cm catalyst depth. In the reactor, the catalyst was diluted to 1 percent with inactive ingredients to lower the reaction rate in the bed. Without this dilution, only a fraction of 1 cm in bed depth would be needed for this reaction at these reaction conditions.

Figure 34:
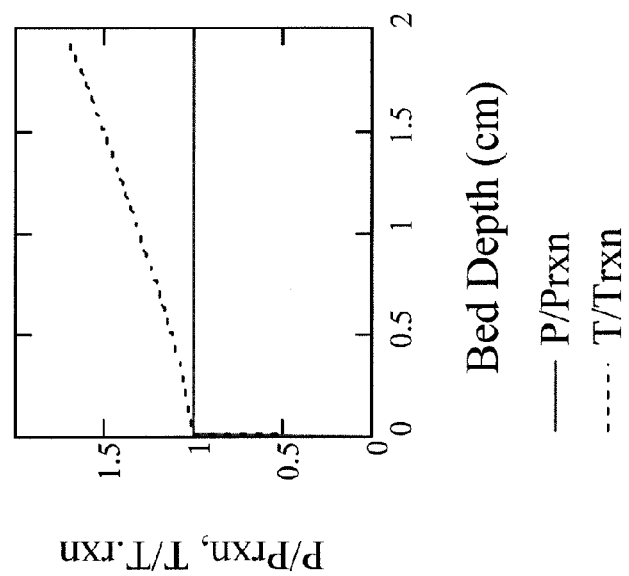

FIGS. 33 and 34 show that the conversion was limited to 0.12 at a bed depth of 2 cm. The reaction temperature increases as the reaction gases progress through the bed and the pressure is essentially constant for such bed depths. At larger bed depths, the reaction is limited by the reduction of iron oxide and terminates the reaction conversion.

Adding the effect of cooling (e.g., so that the reaction products that leave the reactor are at nearly the same temperature as they enter) the reactor conversion is not limited by the oxidation of iron and a greater amount of the catalyst bed can be utilized for the two-step methane reduction reaction, arriving at a reaction conversion of 0.3 in a single pass. Due to larger reaction conversion, the pressure drop is expended over 7 cm of the catalyst bed with cooling. Adding cooling to a reactor is beneficial because increasing the outlet conversion of the reactor above that of the adiabatic reactor enables single pass conversion to be increased over that of the adiabatic reactor.

While the disclosure may be subjected to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents. For example, elements and features disclosed in relation to one embodiment may be combined with elements and features disclosed in relation to other embodiments of the disclosure.

What is claimed is:

1. A reactor for producing a solid carbon material, comprising:
    at least one reaction chamber configured to produce a solid carbon material and water vapor through a reduction reaction between at least one carbon oxide and at least one gaseous reducing material in the presence of at least one catalyst material structure comprising a catalyst material and at least partially extending through the at least one reaction chamber;
    at least one cooling chamber operatively communicating with the at least one reaction chamber and configured to condense the water vapor produced in the at least one reaction chamber, wherein the at least one cooling chamber is configured to have an operating temperature of less than or equal to about 50° C.;
    at least one porous material structure configured to support at least one layer of the at least one catalyst material within the at least one reaction chamber and to separate at least one region of the at least one reaction chamber from at least one other region of the at least one reaction chamber; and
    at least one conveying mechanism configured to transport the at least one catalyst material structure through the at least one reaction chamber.

2. The reactor of claim 1, wherein the at least one reaction chamber is configured to produce the solid carbon material through at least one of a Bosch reaction, a Boudouard reaction, and a methane reduction reaction.

3. The reactor of claim 1, wherein the at least one reaction chamber is configured to withstand an operating temperature greater than or equal to about 450° C.

4. The reactor of claim 1, further comprising a heat exchange zone operatively associated with each of at least one effluent gas line and at least one return gas line extending between the at least one reaction chamber and the at least one cooling chamber, and configured to exchange heat between the at least one effluent gas line and the at least one return gas line.

5. The reactor of claim 1, further comprising at least one prime mover operatively associated with each of the at least one reaction chamber and the at least one cooling chamber and configured to promote a flow of gases through the reactor.

6. The reactor of claim 1, wherein the at least one layer of the at least one catalyst material is on the at least one porous material structure.

7. The reactor of claim 1, wherein the at least one layer of the at least one catalyst material is between two layers of the at least one porous material structure.

8. The reactor of claim 1, wherein the at least one porous material structure is coupled to an outer shell configured to at least partially define the at least one reaction chamber.

9. The reactor of claim 8, wherein the outer shell comprises at least one reaction gas inlet, at least one reaction product outlet, at least one catalyst material inlet, and at least one catalyst material outlet.

10. The reactor of claim 8, wherein the at least one reaction chamber comprises a plurality of reaction chambers.

11. The reactor of claim 1, wherein the at least one catalyst material comprises at least one catalyst material structure at least partially extending through the at least one reaction chamber.

12. The reactor of claim 11, further comprising at least one conveying mechanism configured to transport the at least one catalyst material structure through the at least one reaction chamber.

13. The reactor of claim 1, wherein the at least one conveying mechanism is configured to continuously transport the at least one catalyst material structure through the at least one reaction chamber.

14. The reactor of claim 1, wherein the at least one catalyst material structure comprises a foil, a sheet, mesh, or a ribbon of the catalyst material.

* * * * *

UNITED STATES PATENT AND TRADEMARK OFFICE
CERTIFICATE OF CORRECTION

PATENT NO. : 9,650,251 B2
APPLICATION NO. : 14/648384
DATED : May 16, 2017
INVENTOR(S) : Dallas B. Noyes It is certified that error appears in the above-identified patent and that said Letters Patent is hereby corrected as shown below:

In the Specification

Column 25, Line 2, change "depicting for the" to --depicting $\Delta H_{rxn}$ for the--

Signed and Sealed this
Ninth Day of January, 2018

Joseph Matal
*Performing the Functions and Duties of the*
*Under Secretary of Commerce for Intellectual Property and*
*Director of the United States Patent and Trademark Office*